(12) United States Patent
Ohashi

(10) Patent No.: US 7,136,236 B2
(45) Date of Patent: Nov. 14, 2006

(54) SUPERWIDE-ANGLE LENS OPTICAL SYSTEM, AND IMAGING UNIT AND DISPLAY UNIT COMPRISING THE SAME

(75) Inventor: Masahito Ohashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 81 days.

(21) Appl. No.: 10/972,002

(22) Filed: Oct. 25, 2004

(65) Prior Publication Data

US 2005/0088762 A1    Apr. 28, 2005

(30) Foreign Application Priority Data

Oct. 24, 2003  (JP) .............................. 2003-364423

(51) Int. Cl.
  *G02B 13/04*  (2006.01)
  *G02B 17/00*  (2006.01)
(52) U.S. Cl. ...................................... 359/749; 359/726
(58) Field of Classification Search ........ 359/749–753, 359/725, 726
See application file for complete search history.

(56) References Cited

U.S. PATENT DOCUMENTS 4,647,161 A    3/1987  Muller ....................... 350/462
4,812,024 A *  3/1989  Mukaiya ..................... 359/683
5,434,713 A    7/1995  Sato ........................... 359/725

FOREIGN PATENT DOCUMENTS

JP    2002-072085    3/2002

* cited by examiner

Primary Examiner—Scott J. Sugarman
(74) Attorney, Agent, or Firm—Kenyon & Kenyon LLP

(57) ABSTRACT

The invention relates to a superwide-angle lens optical system having a long back-focus lens arrangement and comprising a relay lens group. The optical system is constructed of, in order from an object side thereof, an objective lens group Ob having positive refracting power, a primary image-formation plane formed by the objective lens group Ob and a relay lens group R1 having positive refracting power. A field stop FS is positioned at or near the primary image-formation plane, and condition (1-1) is satisfied.

$$h/f_o > 1.8 \tag{1-1}$$

Here $f_o$ is the focal length of the objective lens group Ob, and h is the diameter of an image circle on the primary image-formation plane.

45 Claims, 12 Drawing Sheets

SUPERWIDE-ANGLE LENS OPTICAL SYSTEM, AND IMAGING UNIT AND DISPLAY UNIT COMPRISING THE SAME

The application claims benefit of Japanese Application No. 2003-364423 filed in Japan on Oct. 24, 2003, the contents of which are incorporated by this reference.

BACKGROUND OF THE INVENTION

The present invention relates generally to a superwide-angle lens optical system, and more particularly to a superwide-angle lens optical system comprising a relay lens system as well as an imaging unit and a display unit, each comprising the same.

So far, a superwide-angle lens system has been used in various applications in the form of such fish-eye lenses as set forth in the following patent publications 1, 2 and 3.

Patent Publication 1
JP(A)62-36622
Patent Publication 2
JP(A)2002-72085
Patent Publication 3
JP(A)5-273459

However, when there is provided a back focus enough to receive an optical path-bending member such a quick return mirror used with single-lens reflect cameras, etc. and various filters, etc., a problem arises; the back focus becomes long with respect to the focal lengths of lenses, and so the diameter of an object-side lens becomes too large. As the image circle of an image pickup plane increases, another problem arises; the diameter of the object-side lens becomes too large. In addition, such prior art lens systems are not fit for improvements in the degree of flexibility in optical system layouts by incorporating a plurality of optical path-bending members, or layouts wherein a relatively wide air space is allowed for in a lens group to receive a plurality of optical systems efficiently.

SUMMARY OF THE INVENTION

In view of such prior art problems as described above, one object of the invention is to provide a superwide-angle lens optical system having a long back-focus lens arrangement and comprising a relay lens system, and another object is to provide an imaging unit and a display unit, each comprising that superwide-angle lens optical system.

According to the first aspect of the invention, the aforesaid objects are achievable by the provision of a superwide-angle lens optical system, characterized by comprising, in order from an object side thereof, an objective lens group having positive refracting power, a primary image-formation plane formed by said objective lens group, and a relay lens group having positive refracting power, wherein a field stop is located at or near the position of said primary image-formation plane, and condition (1-1) is satisfied:

$$h/f_o > 1.8 \quad (1\text{-}1)$$

where $f_o$ is the focal length of said objective lens group, and h is the diameter of an image circle on said primary image-formation plane.

According to the second aspect of the invention, there is provided a superwide-angle lens optical system, characterized by comprising, in order from an object side thereof, an objective lens group having positive refractive power, a primary image-formation plane formed by said objective lens group, a relay lens group having positive refracting power, and an image-reformation plane formed by said relay lens group, wherein condition (1-2) is satisfied:

$$h_r/f_a > 1.8 \quad (1\text{-}2)$$

where $f_a$ is the focal length of a combined system of said objective lens group and said relay lens group, and $h_r$ is the diameter of an image circle on said image-reformation plane.

The advantages of, and the requirements for, the superwide-angle lens optical systems constructed according to the first and second aspects of the invention are now explained.

The image-formation plane formed by the objective lens group is reformed through the relay optical system to make the back focus of the objective lens group short, thereby making the diameter of an object-side lens compact. Satisfaction of conditions (1-1) and (1-2), to which the lower limit is 1.8, makes it easy to ensure the back focus and the compact front lens diameter without recourse to the relay optical system.

The lower limit to each condition should be set at preferably at least 2.2, more preferably at least 2.4. Although there is no explicit upper limit to conditions (1-1) and (1-2), it is understood that the upper limit is defined by a value corresponding to a substantial angle of view of 180°, and exceeding that upper limit renders it difficult to construct the superwide-angle lens optical system according to the invention. It is also noted that image deteriorations (ghosts, flares, etc.) due to unnecessary light at the relay optical system is reduced by the location of the field stop.

Moreover, it is preferable to satisfy condition (2):

$$4 > S_{ko}/f_o \geq 0 \quad (2)$$

where $S_{ko}$ is the back focus of the objective lens group.

Satisfaction of condition (2), to which the upper limit is 4, makes it easy to ensure the back focus and the compact front lens diameter without recourse to the relay optical system. As the lower limit of 0 is not reached, it is difficult to locate the field stop. It is noted that $S_{ko}/f_o=0$ implies that the primary image-formation plane is located on the exit plane of the objective lens group.

Further, if the lower limit to condition (2) is set at 0.1 or even 0.5, it is then by far easier to ensure a space for receiving a field frame positioned at or near the primary image-formation plane.

Furthermore, if the upper limit is set at 3 or even 2.5, it is then by far easier to make the length of the objective lens short.

The incorporation of the means for determining the range of field on the image-reformation plane is preferred, because it is unnecessary to place a physical field stop at the primary image-formation plane.

It is also preferable to determine a field in a specific direction by the stop at the primary image-formation plane and a field in another direction by a secondary image-formation plane (the image-reformation plane) by the secondary image-formation plance, because unnecessary light can be efficiently cut, with an increase in the degree of flexibility in taking the back focus of the objective lens, and it is possible to make efficient use of an image pickup device located at the image-reformation plane as well. For instance, given a substantially rectangular field, a field in the long-side direction is determined by the stop at the primary image-formation plane while a field in the short-side direction is determined by the secondary image-formation plane.

According to the third aspect of the invention, there is provided a superwide-angle lens optical system, characterized by comprising, in order from an object side thereof, an objective lens group having positive refracting power, a primary image-formation plane formed by said objective lens group, and a relay lens group having positive refracting power, wherein said relay lens group comprises a front lens subgroup RG1 having positive refracting power and a rear lens subgroup RG2 having positive refracting power, and satisfies condition (3):

$$0.05 < f_o/f_{r1} < 1.2 \tag{3}$$

where $f_{r1}$ is the focal length of the front lens subgroup RG1 in said relay lens group, and $f_o$ is the focal length of said objective lens group.

The advantage of, and the requirement for, the superwide-angle lens optical system constructed according to the third aspect of the invention are now explained.

Condition (3) is provided to ensure a space between the front lens subgroup RG1 and the rear lens subgroup RG2 in the relay lens group. As the lower limit of 0.05 to this condition is not reached, the diameter of an axial light beam incident on the rear lens subgroup RG2 becomes too large in the case where a space is created between the front and rear lens subgroups RG1 and RG2 in the relay lens group. Exceeding the upper limit of 1.2 is not preferred, because the effective area of the surface located nearest to the object side in the rear lens subgroup RG2 becomes too large due to an off-axis light beam incident on the rear lens subgroup RG2.

Preferably, the lower limit to condition (3) should be set at 0.08, especially 0.12, or the upper limit should be set at 0.7, especially 0.3.

According to the fourth aspect of the invention, any one of the $1^{st}$ to $3^{rd}$ superwide-angle lens optical systems is further characterized in that said objective lens group comprises, in order from an object side thereof, a front lens subgroup OG1 having negative refracting power and a rear lens subgroup OG2 having positive refracting power, and an aperture stop is interposed between said front lens subgroup OG1 and said rear lens subgroup OG2.

The advantages of, and the requirements for, the superwide-angle lens optical system constructed according to the fourth aspect of the invention are now explained.

In order for a wide-angle lens to have a back focus of more than 0 with an increasing angle of view, it should preferably be of a retrofocus type. The aperture stop is interposed between the front and rear lens subgroups OG1 and OG2 in the objective lens group, so that the diameter of the rear lens subgroup OG2 is decreased, and a light beam at the front lens subgroup OG1 is easily split according to the angle of view, so that it is easy to make correction for off-axis aberrations that are a problem with a superwide-angle lens system.

Preferably, it is easy to interpose the conjugate surface of the aperture stop to the rear lens subgroup OG2 in the objective lens group and the front lens subgroup RG1 in the relay lens group between the front and rear lens subgroups RG1 and RG2 in the relay optical system. This in turn permits the outside diameters of the front and rear lens subgroups RG1 and RG2 in the relay lens group to be well balanced, and ensures efficient correction of aberrations of off-axis light beams at the front and rear lens subgroups RG1 and RG2 in the relay lens group.

Since the physical aperture stop is incorporated in the objective lens system, it is unnecessary to interpose any physical stop between the front and rear lens subgroups RG1 and RG2 in the relay lens group, and it is easy to locate mirrors, prisms, filters, etc. there.

Specifically, the superwide-angle lens optical system according to the fifth aspect of the invention may be embodied as follows.

According to the fifth aspect of the invention, the aforesaid $4^{th}$ superwide-angle lens optical system is further characterized in that a conjugate image of said aperture stop is positioned between the front and rear lens subgroups RG1 and RG2 in said relay lens group.

According to the sixth aspect of the invention, the $4^{th}$ or $5^{th}$ superwise-angle lens optical system is further characterized in that the front lens subgroup OG1 in said objective lens group comprises, in order from an object side thereof, a first meniscus lens having negative refracting power, a second meniscus lens having negative refracting power and a third meniscus lens having positive refracting power, and the rear lens subgroup OG2 in said objective lens group comprises a lens having positive refracting power and a cemented lens having positive refracting power.

The advantage of, and the requirement for, the superwide-angle lens optical system constructed according to the $6^{th}$ aspect of the invention are now explained.

In accordance with such an optical system arrangement as recited above, wherein the objective lens group comprises a reduced number of lenses, axial aberrations are placed in good order at the lens of positive refracting power in the rear lens subgroup OG2 while light rays are gently bent especially at the front lens subgroup OG1, and that lens cooperates with the cemented lens to ensure power, so that an image can be formed on the primary image-formation plane. This arrangement is also preferable for ensuring image-formation capability with a reduced number of lenses, because the angle of incidence of light rays on the relay lens group becomes gentle, the outside diameter of the relay lens group becomes compact, and the power of the front lens subgroup RG1 in the relay lens group becomes gentle.

According to the $7^{th}$ aspect of the invention, there is provided a superwide-angle lens optical system, characterized by comprising, in order from an object side thereof, an objective lens group having positive refracting power, a primary image-formation plane formed by said objective lens group, and a relay lens group having positive refracting power, wherein a field stop is positioned at or near said primary image-formation plane, said relay lens group comprises a front lens subgroup RG1 having positive refracting power and a rear lens subgroup RG2 having positive refracting power, and condition (4) is satisfied:

$$4 < t_3/|f_a| \tag{4}$$

where $t_3$ is an air space between the front and rear lens subgroups RG1 and RG2 in said relay lens group, and $f_a$ is the focal length of a combined system of said objective lens group and said relay lens group.

Such an optical system arrangement as recited above enables an increased air space to be taken between the front and rear lens subgroups RG1 and RG2 in the relay lens group, so that a reflecting member such as a mirror can be located therein. As the lower limit of 4 to condition (4) is not reached, it is impossible to allow for any air space between the front and rear lens subgroups RG1 and RG2; the reflecting member, etc. cannot be incorporated.

More preferably, $$6 < t_3/|f_a| \tag{4-1}$$

It is acceptable to set the upper limit to conditions (4) and (4-1); that is, $t_3/|f_a| < 100$.

As the upper limit of 100 is exceeded, the whole lens arrangement becomes too bulky.

That upper limit may be reduced down to 30.

The aforesaid $1^{st}$ to $7^{th}$ optical system arrangements could be applied in combination of two or more. Specifically, the superwide-angle lens optical system according to the $8^{th}$ aspect of the invention may be embodied as follows.

According to the $8^{th}$ aspect of the invention, there is provided a superwide-angle lens optical system, characterized by comprising, in order from an object side thereof, an objective lens group having positive refracting power, a primary image-formation plane formed by said objective lens group, and a relay lens group having positive refracting power, wherein a field stop is positioned at or near said primary image-formation plane, said relay lens group comprises a front lens subgroup RG1 having positive refracting power and a rear lens subgroup RG2 having positive refracting power, and conditions (3) and (4) are satisfied:

$$0.05 < f_o/f_{r1} < 1.2 \quad (3)$$

$$4 < t_3/|f_a| \quad (4)$$

where $f_{r1}$ is the focal length of the front lens subgroup RG1 in said relay lens group, $f_o$ is the focal length of said objective lens group, $t_3$ is an air space between the front and rear lens subgroups RG1 and RG2 in said relay lens group, and $f_a$ is the focal length of a combined system of said objective lens group and said relay lens group.

The advantage of, and the requirement for, the superwide-angle lens optical system constructed according to the $8^{th}$ aspect of the invention are now explained.

By satisfaction of condition (3), it is possible to easily achieve an arrangement that satisfies condition (4). It is noted that the upper limit to condition (4) is determined depending on the space needed for receiving the reflecting member, etc.

According to the $9^{th}$ aspect of the invention, any one of the aforesaid $3^{rd}$ to $8^{th}$ superwide-angle lens optical systems is further characterized by satisfying condition (5):

$$1 < f_{r2}/f_{r1} < 2 \quad (5)$$

where $f_{r1}$ is the focal length of the front lens subgroup RG1 in said relay lens group, and $f_{r2}$ is the focal length of the rear lens subgroup RG2 in said relay lens group.

The advantage of, and the requirement for, the superwide-angle lens optical system constructed according to the $9^{th}$ aspect of the invention are now explained.

As the lower limit of 1 to condition (5) is not reached, the outside diameter of the first lens in the front lens subgroup OG1 in the objective lens group becomes large, failing to achieve compactness and cost reductions. As the upper limit of 2 to condition (5) is exceeded, it is difficult to balance lens processability against correction of various aberrations.

Preferably, that lower limit should be set at 1.1 or even 1.2 or that upper limit should be set at 1.7 or even 5.

According to the $10^{th}$ aspect of the invention, any one of the aforesaid $1^{st}$ to $9^{th}$ superwide-angle lens optical systems is further characterized by satisfying condition (6):

$$1 < \alpha < 2 \quad (6)$$

where $\alpha$ is the relay magnification of said relay lens group.

The advantage of, and the requirement for, the superwide-angle lens optical system constructed according to the $10^{th}$ aspect of the invention are now explained.

As the lower limit of 1 to condition (6) is not reached, the diameter of the objective lens group in general, and the outside diameter of the first lens in particular of the front lens subgroup OG1 in the objective lens group becomes too large, and as the upper limit of 2 to condition (6) is exceeded, the load on the relay lens group becomes too large, rendering well-balanced correction of aberrations difficult.

It is more preferable to set the lower limit to condition (6) at 1.1 or even 1.2, because the magnification of the relay lens group is ensured easily with a decrease in the diameter of the objective lens group.

More preferably, the upper limit to condition (6) should be set at 1.7 or even 1.5.

According to the $11^{th}$ aspect of the invention, any one of the aforesaid $3^{rd}$ to $10^{th}$ superwide-angle lens optical systems is further characterized by satisfying condition (7):

$$4 < f_{r2}/f_o < 15 \quad (7)$$

where $f_o$ is the focal length of said objective lens group, and $f_{r2}$ is the focal length of the rear lens subgroup RG2 in said relay lens group.

The advantage of, and the requirement for, the superwide-angle lens optical system constructed according to the $11^{th}$ aspect of the invention are now explained.

Condition (7) is provided to ensure the back focus of the whole optical system (the distance between the relay optical system and the image-reformation plane). By satisfying this condition, it is possible to ensure a space large enough to receive mirrors, prisms, filters, etc. between the relay optical system and the image-reformation plane. In particular, condition (7) is preferable for ensuring the space for bending an optical path.

As the lower limit of 4 to condition (7) is not reached, it is impossible to ensure any space for the relay optical system and the image-reformation plane, and exceeding the upper limit of 15 is not preferable because the contour of the rear lens subgroup RG2 in the relay lens group becomes large.

More preferably, condition (7) should be used in combination with condition (3).

Even more preferably, the lower limit to condition (7) should be set at 6 or even 7.5, or the upper limit to condition (7) should be set at 13 or even 10.

According to further aspects, the present invention provides an imaging unit comprising any one of the aforesaid superwide-angle lens optical systems and an image pickup device located on its image side, a superwide-angle electronic imaging unit incorporating such an imaging unit, and a display unit comprising any one of the aforesaid superwide-angle lens optical systems and a display device located on its image side.

As described above, the present invention typically provides a superwide-angle lens optical system that has a long back-focus lens arrangement and comprises a relay lens system which can be laid out with a high degree of flexibility and enables a plurality of optical systems to be efficiently laid out.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1:
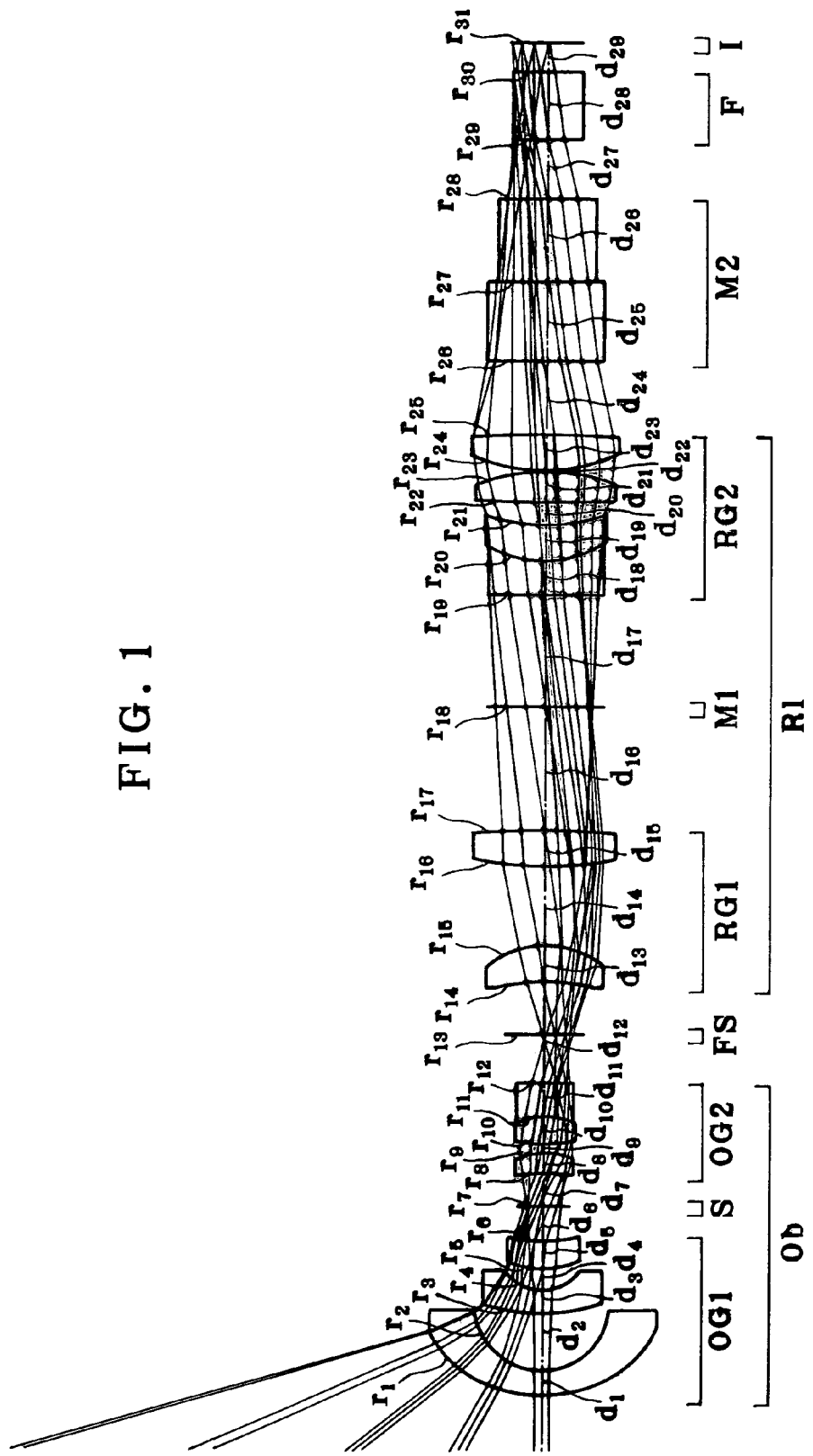
FIG. 1 is a taken-apart optical path diagram for the superside-angle lens optical system of Example 1 according to the invention upon focusing on an infinite object point.

First of all, Example 1 of the superwide-angle lens optical system of the invention is now explained. FIG. 1 is a taken-apart optical path diagram for Example 1 upon focusing on an object point at infinity, and FIG. 2 is a sectional view as taken along the optical axis thereof.

Figure 2:
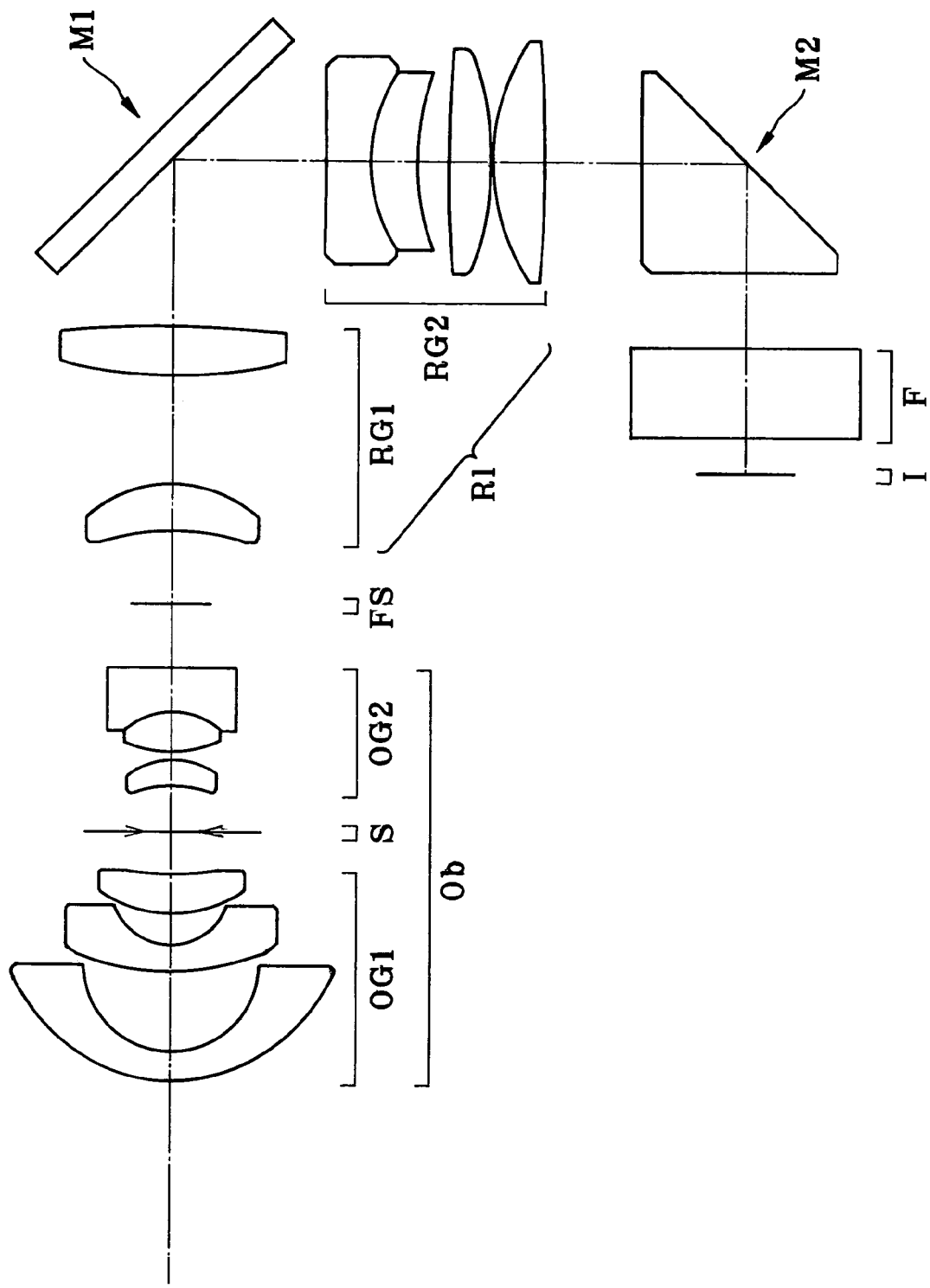
FIG. 2 is a sectional view as taken along the optical axis of the superwide-angle lens optical system according to Example 1.
Figure 3A:
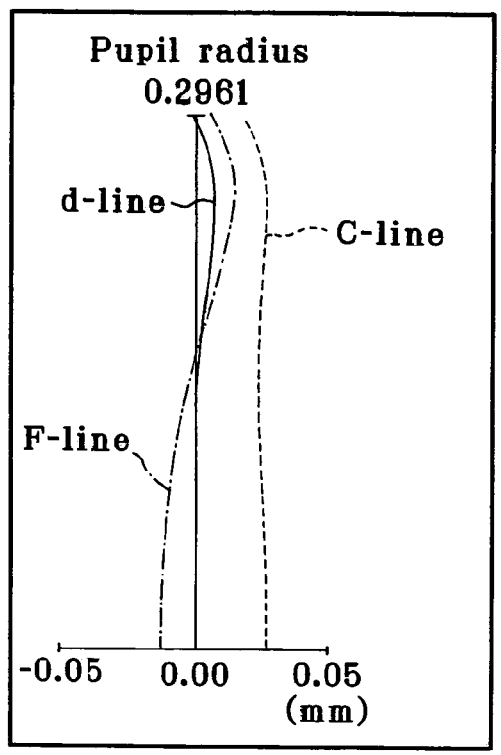
FIGS. 3(a), 3(b), 3(c) and 3(d) are aberration diagrams for spherical aberrations (a), astigmatisms (b), distortions (c) and chromatic aberrations of magnification (d) of Example 1 upon focusing at infinity.
Figure 3B:
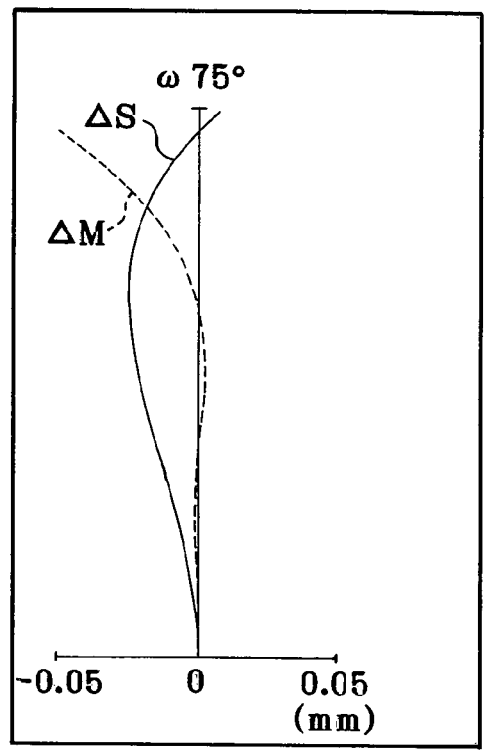
Figure 3C:
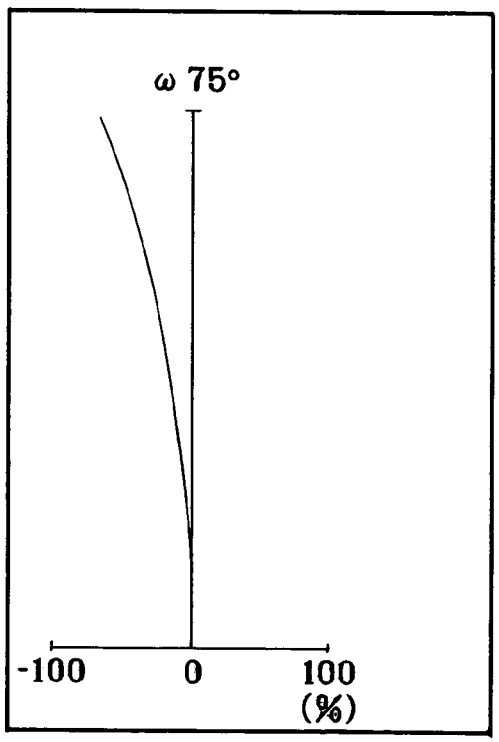
Figure 3D:
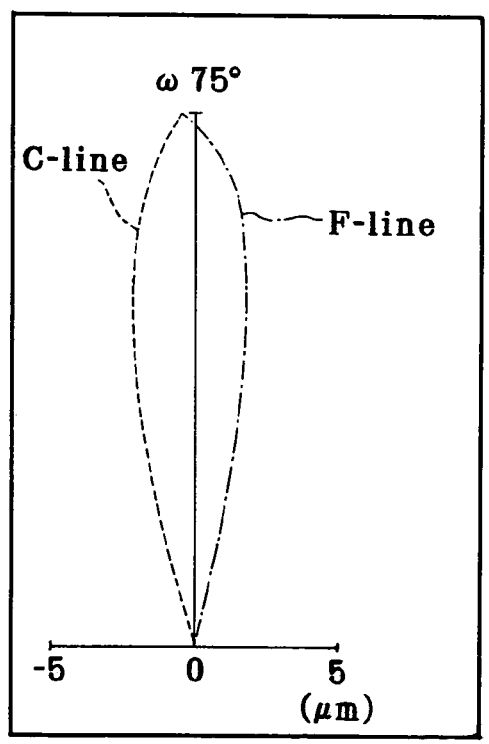

As shown in FIGS. 1 and 2, Example 1 is directed to a superwide-angle lens optical system is composed of, in order from its object side, an objective lens group Ob having positive refracting power, a field stop FS located at a primary image-formation plane formed by the objective lens group Ob, and a relay lens group R1 having positive refracting power. The objective lens group Ob is composed of a front lens subgroup OG1 having negative refracting power and a real lens subgroup OG2 having positive refracting power, and an aperture stop S is interposed between the front and rear lens subgroups OG1 and OG2. The relay lens group R1 is composed of a front lens subgroup RG1 having positive refracting power and a rear lens subgroup RG2 having positive refracting power.

In Example 1, a reflecting mirror M1 for bending an optical axis through 90° is interposed between the front and rear lens subgroups RG1 and RG2 in the relay lens group R1, and a reflecting prism M2 for bending the optical axis through 90° within the same plane and in the same direction is interposed between that rear lens subgroup RG2 and an image plane I, so that the axis of light entering the image plane I lies parallel with, and directs oppositely to, the axis of light entering the objective lens group Ob. It is noted that just before the image plane I, there is located a filter F that acts as a combined low-pass filter and IR cut filter.

The front lens subgroup OG1 in the objective lens group Ob is composed of two negative meniscus lenses, each convex on its object side, and a positive meniscus lens convex on its object side, and the rear lens subgroup OG2 is composed of a positive meniscus lens concave on its object side and a cemented lens consisting of a double-convex positive lens and a double-concave negative lens. The front lens subgroup RG1 in the relay lens group R1 is composed of a positive meniscus lens concave on its object side and a double-convex positive lens, and the rear lens subgroup RG2 is composed of a cemented lens consisting of a double-concave negative lens and a positive meniscus lens, and two double-convex positive lenses.

It is to be understood that to use this optical system in the form of such an axially long superwide-angle lens optical system as shown in FIG. 1, the reflecting mirror M1 and reflecting prism M2 could be dispensed with, and that a reflecting prism could be used in place of the reflecting mirror M1. In this case, the focal lengths of the front and rear lens subgroups RG1 and RG2 in the relay lens group G1 are calculated for a partial system with respect to the reflecting surface, and a space $t_3$ is defined as an air basis length between powered surfaces with the reflecting surface positioned between them.

Set out below are numerical data on the superwide-angle lens optical system of Example 1. The field stop FS has a rectangular aperture shape sized such that the lateral direction (along the paper of FIG. 2)×the longitudinal direction is 2.2 mm×1.48 mm. Likewise, the image plane I is sized such that the lateral direction (along the paper of FIG. 2)×the longitudinal direction is 2.75 mm×1.84 mm. The diameter of an image circle is 3.3 mm.

Enumerated below are the numerical data about Example 1. It is noted that the symbols used hereinafter but not hereinbefore have the following meanings.

$F_{NO}$ is an F-number; $r_1, r_2, \ldots$ are the radius of curvature of each lens surface; $d_1, d_2, \ldots$ are the space between adjacent lenses; $n_{d1}, n_{d2}, \ldots$ are the d-line refractive index of each lens; and $v_{d1}, v_{d2}, \ldots$ are the Abbe number of each lens.

EXAMPLE 1

| | | | |
|---|---|---|---|
| $r_1 = 5.805$ | $d_1 = 1$ | $n_{d1} = 1.883$ | $v_{d1} = 40.76$ |
| $r_2 = 2.908$ | $d_2 = 2.5$ | | |
| $r_3 = 9.004$ | $d_3 = 0.9$ | $n_{d2} = 1.7725$ | $v_{d2} = 49.6$ |
| $r_4 = 1.89$ | $d_4 = 1$ | | |
| $r_5 = 4.002$ | $d_5 = 1.2$ | $n_{d3} = 1.72825$ | $v_{d3} = 28.46$ |
| $r_6 = 6.991$ | $d_6 = 1.5$ | | |
| $r_7 = \infty$ (Aperture Stop) | $d_7 = 1.5$ | | |
| $r_8 = -4.021$ | $d_8 = 0.9$ | $n_{d4} = 1.7725$ | $v_{d4} = 49.6$ |
| $r_9 = -2.28$ | $d_9 = 0.2$ | | |
| $r_{10} = 3.771$ | $d_{10} = 1.4$ | $n_{d5} = 1.72916$ | $v_{d5} = 54.68$ |
| $r_{11} = -2.132$ | $d_{11} = 1.4$ | $n_{d6} = 1.69895$ | $v_{d6} = 30.13$ |
| $r_{12} = 29.857$ | $d_{12} = 2.25$ | | |
| $r_{13} = \infty$ (Field Stop) | $d_{13} = 2.25$ | | |
| $r_{14} = -8.175$ | $d_{14} = 1.55$ | $n_{d7} = 1.69895$ | $v_{d7} = 30.13$ |
| $r_{15} = -4.16$ | $d_{15} = 3.5$ | | |
| $r_{16} = 13.083$ | $d_{16} = 1.7$ | $n_{d8} = 1.58913$ | $v_{d8} = 61.14$ |
| $r_{17} = -34.244$ | $d_{17} = 5.5$ | | |
| $r_{18} = \infty$ (Reflecting Surface) | $d_{18} = 5$ | | |
| $r_{19} = -171.745$ | $d_{19} = 1.4$ | $n_{d9} = 1.78472$ | $v_{d9} = 25.68$ |

-continued

| | | | |
|---|---|---|---|
| $r_{20} = 4.966$ | $d_{20} = 1.6$ | $n_{d10} = 1.72916$ | $\nu_{d10} = 54.68$ |
| $r_{21} = 8.754$ | $d_{21} = 1$ | | |
| $r_{22} = 49.792$ | $d_{22} = 1.4$ | $n_{d11} = 1.72916$ | $\nu_{d11} = 54.68$ |
| $r_{23} = -10.237$ | $d_{23} = 0.02$ | | |
| $r_{24} = 7.151$ | $d_{24} = 1.7$ | $n_{d12} = 1.58913$ | $\nu_{d12} = 61.14$ |
| $r_{25} = -78.839$ | $d_{25} = 3.2$ | | |
| $r_{26} = \infty$ | $d_{26} = 3.5$ | $n_{d13} = 1.51633$ | $\nu_{d13} = 64.14$ |
| $r_{27} = \infty$(Reflecting Surface) | $d_{27} = 3.5$ | $n_{d14} = 1.51633$ | $\nu_{d14} = 64.14$ |
| $r_{28} = \infty$ | $d_{28} = 2.5$ | | |
| $r_{29} = \infty$ | $d_{29} = 3$ | $n_{d15} = 1.51633$ | $\nu_{d15} = 64.14$ |
| $r_{30} = \infty$ | $d_{30} = 1.1578$ | | |
| $r_{31} = \infty$(Image Plane) | | | |

$F_{NO} = 2.2742$
$h = 2.65$
$h_r = 3.3$
$f_a = -1.35$
$f_o = 1.09$
$S_{ko} = 2.25$
$f_{r1} = 7.17$
$f_{r2} = 9.42$
$t_3 = 10.5$
$h/f_o = 2.4$
$h_r/|f_a| = 2.4$
$S_{ko}/f_o = 2.1$
$f_o/f_{r1} = 0.15$
$t_3/|f_a| = 7.8$
$f_{r2}/f_{r1} = 1.3$
$\alpha = 1.24$
$f_{r2}/f_o = 8.6$ FIGS. 3(a), 3(b), 3(c) and 3(d) are aberration diagrams for spherical aberrations (a), astigmatisms (b), distortions (c) and chromatic aberrations of magnification (d) of Example 1 upon focusing at infinity, wherein "ω" stands for a half angle of view.

In the superwide-angle lens optical system of the invention, the relay lens group R (the relay optical system) is divided into the front and rear lens subgroups RG1 and RG2, as described in Example 1, between which there can be received a reflecting mirror, a reflecting prism, an ND filter, a quick return mirror, an insertable lens, etc.

It is also easy to take an optical path in such a way that chief light rays become substantially parallel at the front lens subgroup RG1 in the relay optical system. Therefore, if the objective lens group Ob and the front lens subgroup RG1 in the relay lens group R1 are configured into a substantially afocal arrangement, there is then little or no influence on the resultant image even with optional adjustment of the spacing between the front and rear lens subgroups RG1 and RG2 in the relay lens group R1.

Preferably, the superwide-angle lens optical system of the invention is applied to such units as described below by taking advantage of that feature.

For instance, the present invention is applicable to stereo-imaging units, distance finders designed to obtain distance information from parallax information, and onboard cameras.

These units are each composed of a plurality of objective optical systems (objective lens groups) having an entrance surface that faces a subject. It follows that each objective optical system is located in such a way as to face a subject and a relay optical system (relay lens group) is positioned in association with each objective optical system. Alternatively, at least a part of the relay optical system subsequent to each objective optical system could be configured in the form of a common optical system.

Here, if a reflecting surface is used between the front (lens) subgroup and the rear (lens) subgroup in the relay optical system, then the whole optical system can be bent to reduce its length in the entrance optical axis direction (its thickness).

For further size reductions, it is preferable to locate a plurality of reflecting surfaces in the optical path. In one specific embodiment of sliming down the optical system by bending, a reflecting surface (a reflecting mirror or prism) is positioned between the front and rear subgroups in the relay optical system to bend the optical axes in such a direction as to come close to each other.

Further, with a layout wherein a reflecting surface is positioned in the rear of the rear lens subgroup in each relay optical system to guide an associated light beam to a specific position at the image pickup plane of a common image pickup device, it is then possible to obtain a plurality of images with the same image pickup device. This layout is much more reduced in terms of cost and image signal variations than a layout comprising separate image pickup devices.

For instance, there is a stereo-imaging unit wherein for stereo image pickup, two objective optical systems are provided, each operable to reflect light twice, and for achieving a wide field, each objective optical system is constructed of a fish-eye lens.

Figure 4:
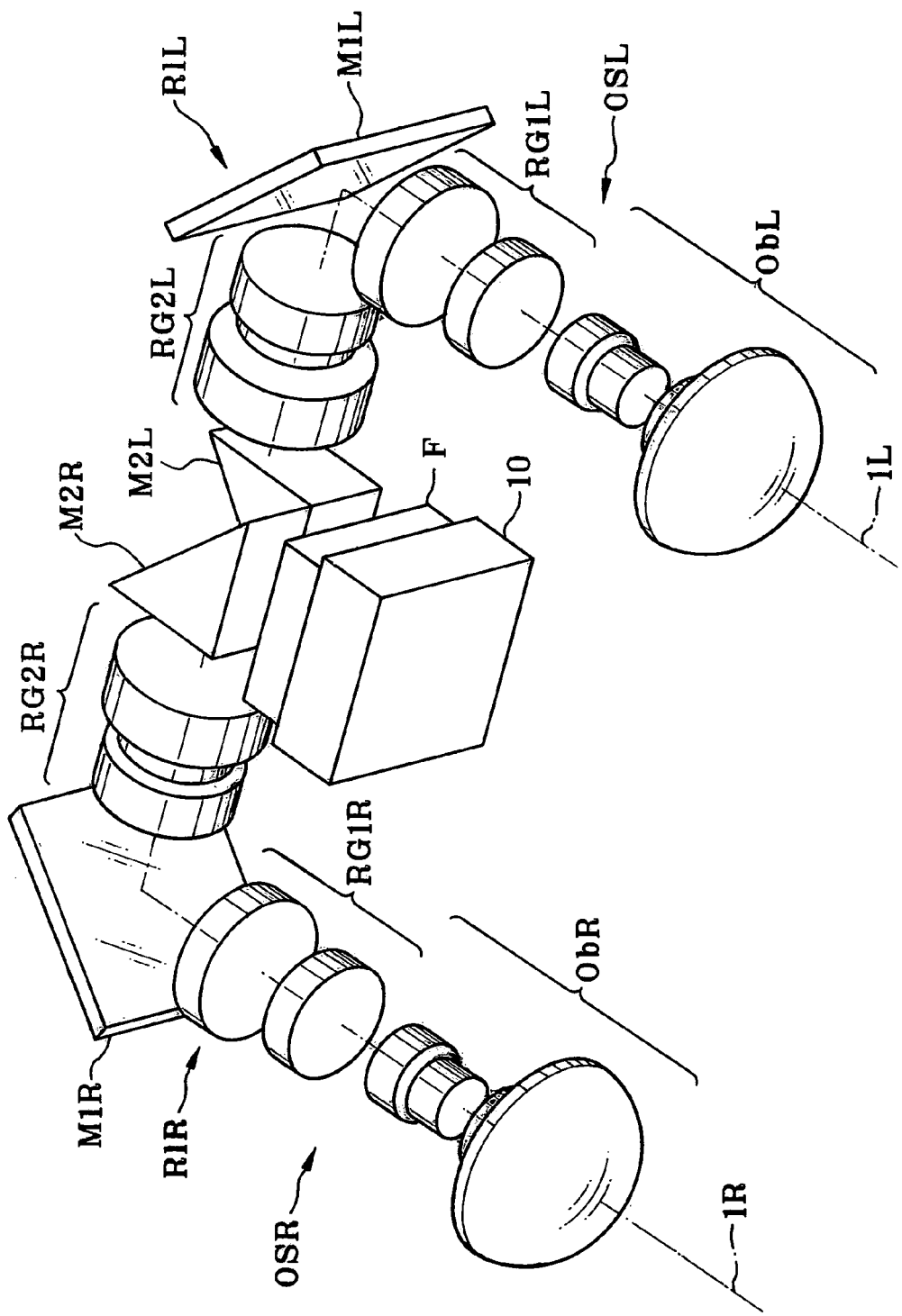
FIG. 4 is a schematic perspective view of a stereo-imaging unit incorporating two superwide-angle lens optical systems, each set up according to Example 1.
Figure 5:
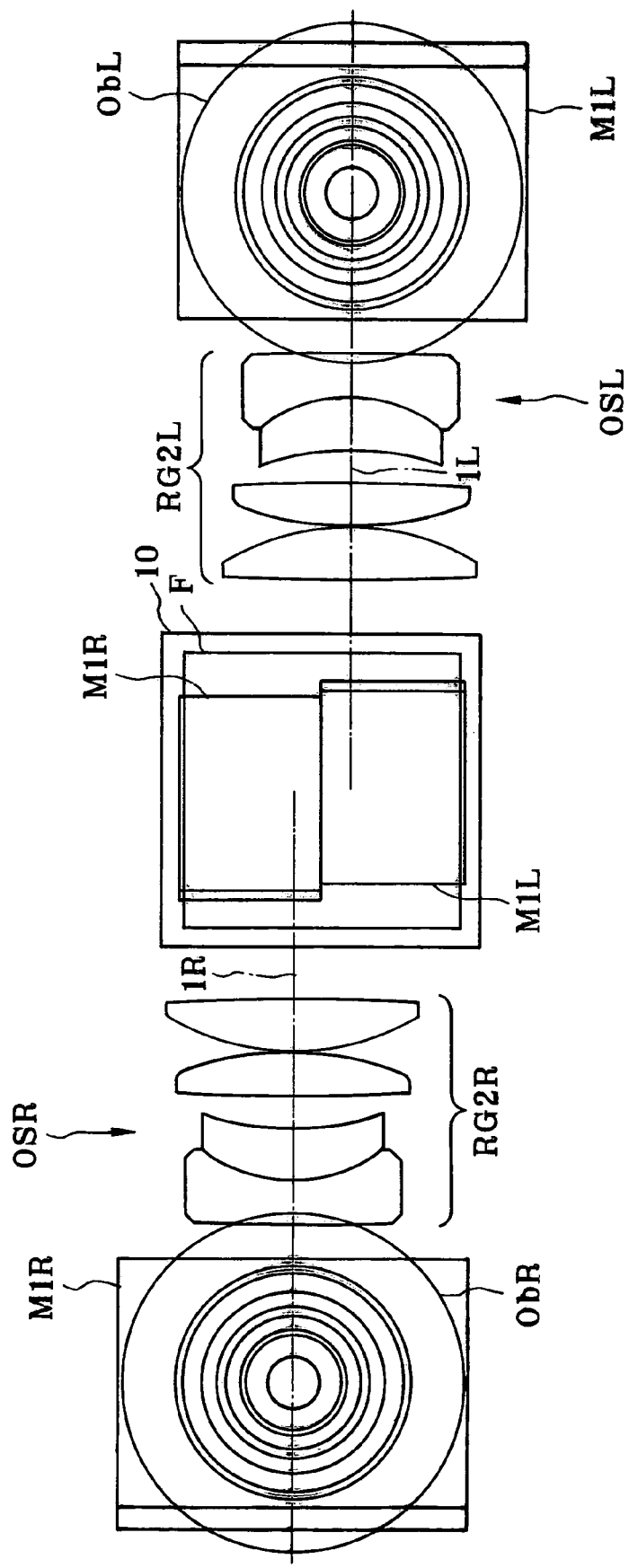
FIG. 5 is a perspective front view of the stereo-imaging unit of FIG. 4.
Figure 6:
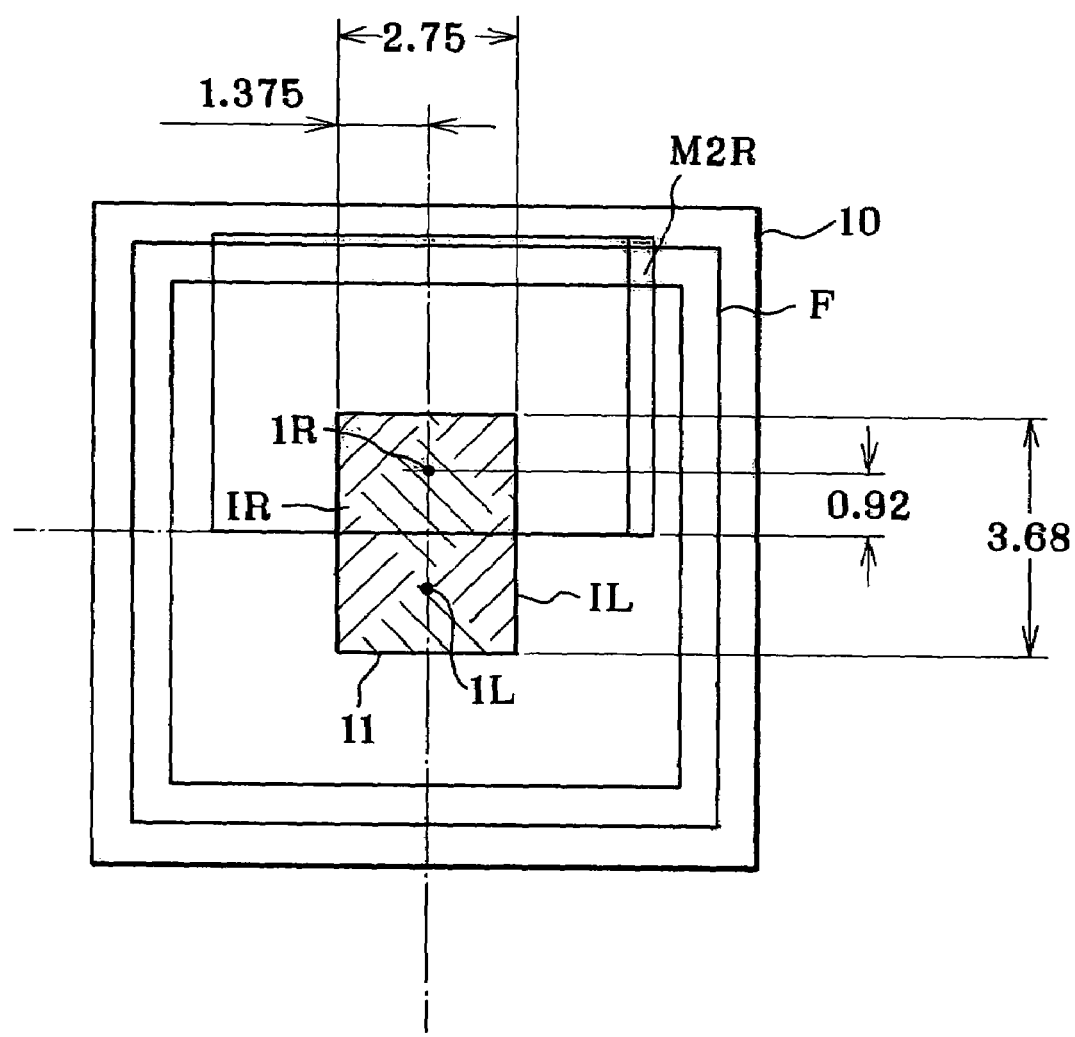
FIG. 6 is a front view of a common image pickup device located commonly to the right and left image planes of the stereo-imaging unit of FIG. 4.

Two superwide-angle lens optical systems set up as shown typically in FIG. 1 are assembled into a stereo-imaging unit as shown in FIG. 4 in schematic perspective. FIG. 5 is a perspective front view of that stereo-imaging unit, and FIG. 6 is a front view of a common image pickup device located commonly to the right and left image planes. In FIG. 6, it is noted that a reflecting prism M2R located in one optical system OSR is shown but another optical system M2L in another optical system OSL is not.

As shown, the superwide-angle lens optical systems for the right and left optical paths are indicated at OSR and OSL, and the respective optical axes at 1R and 1L. For the sake of distinction, elements that form the superwide-angle lens optical systems OSR and OSL are suffixed with "R" and "L", respectively.

This stereo-imaging unit is comprised of two objective lens groups ObR and ObL, each having an entrance surface that faces a subject side. More specifically, the objective lens group ObR, ObL in the superwide-angle lens optical system OSR, OSL is positioned in such a way as to face the subject side, and a relay lens group R1R, R1L is placed in association with the objective lens group ObR, ObL.

The optical axes 1R and 1L are bent by reflecting mirrors M1R and M1L in the associated superwide-angle lens optical systems OSR and OSL in such a way that they are parallel with each other and come close to each other from opposite sides. Here the direction of the bent optical axes 1R and 1L is taken as lateral. Now at reflecting prisms M2R and M2L placed one upon another in a longitudinal direction, the optical axes 1R and 1L are bent in such a way that they run mutually parallel yet in longitudinal alignment in the same direction. Commonly to both the optical systems OSR and OSL, there is provided one single filter F.

In this embodiment, a rectangular image pickup plane 11 of an image pickup device 10 is located with its long-side positioned in the longitudinal direction (FIG. 6) such that image planes IR and IL are formed on the image pickup plane 11 in longitudinal alignment by the right- and left-optical path superwide-angle lens optical systems OSR and OSL having mutual parallaxes. The optical axes 1R and 1L enter vertically the image pickup plane 11 via the longitudinally located reflecting prisms M2R and M2L.

Such an arrangement ensures wide fields in both the lateral and longitudinal directions even with recourse to one single image pickup device 10.

Such an optical system arrangement is preferable for use with an optical system in an onboard camera necessary to look forward or sideward, in particular an onboard camera for checking backward, a surveillance camera, etc. When that optical system arrangement is used for a surveillance camera, it is preferable to subject the whole to a scalar multiple (e.g., ½-inch CCD; base line length of 70 mm).

The optical axes 1R and 1L of the superwide-angle lens optical systems OSR and OSL take the form of straight lines in the state of FIG. 1 that is a taken-apart optical path diagram, and all refracting surfaces contributing to phototaking in the optical systems are of rotationally symmetric shape with respect to the optical axes 1R and 1L. The optical axes 1R and 1L are bent by the reflecting surfaces M1 and M2 in the same plane through the respective optical systems OSR and OSL (FIG. 2). Then, the planes inclusive of the optical axes 1R and 1L are displaced longitudinally parallel with each other depending on the amount of displacement of images formed on the image pickup plane 11. Specifically, that amount of displacement is 0.92 mm×2=1.84 mm, as can be seen from FIG. 6.

As described above, the optical axes are bent by the reflecting prisms M2R and M2L just before the image pickup plane 11 at right angles in the horizontal direction (the short-side direction of the image pickup plane: lateral direction), and further bent 90° by the reflecting mirrors M1R and M1L in the relay lens groups R1R and R1L to direct the entrance surfaces toward the subject. Consequently, the optical axes 1R and 1L of the optical systems OSR and OSL look like a U-shape (that permits light to be reflected 90° twice within the same plane and in the same direction), as viewed from above (FIG. 2).

In this embodiment, the field stop FS (FIGS. 1 and 2) is located at the position of an intermediate image formed by each objective lens group ObR, ObL, and configured into an oblong rectangle conforming to the shape of the image pickup plane. Specifically, the lateral direction×the longitudinal direction is 2.2 mm×1.48 mm.

It is thus possible to achieve a compact superwide-angle lens optical system arrangement that, while ensuring a wide field, enables right and left images having parallaxes to be formed on one single image pickup device 10.

In place of the aperture stop, an auto-iris adjustable depending on brightness could be used. Alternatively, the field stop (field frame) FS could be configured into such a shape that parallactic images projected onto the image pickup plane overlap partly each other. Regarding an overlap of images, which image coming from which optical system can be judged by electrical comparison of information on both images. In other words, more image information can be captured by picking up a plurality of images while they overlap each other.

In the instant embodiment, focusing is unnecessary for ordinary use, because the short focal length ensures focusing precision from a far distance to a near distance. In the instant embodiment, a wider range of focusing may be ensured by moving a part or the whole of both optical systems in the direction of the optical axis 1R, 1L; however, focusing should preferably be carried out by movement of only the image pickup device 10 in the direction of the optical axis 1R, 1L, because only one single moving member is needed for that focusing.

With the aforesaid arrangement having an angle of view of about 120° in the horizontal direction and 90° in the vertical direction, it is possible to obtain parallactic images nearly all over the field range. The distance between the right and left entrance optical axes is set at 38 mm.

It is noted that an image pickup area on the image pickup plane 11 is 3.68 mm in the vertical direction and 2.75 mm in the horizontal direction, and that the axes 1R and 1L of light entering the image pickup plane 11 are positioned at the centers of two equal areas obtained by longitudinal division of the image pickup plane 11, with a distance of 1.84 mm between the optical axes on the image pickup plane 11. The image pickup device 10 is a VGA, and the pixel pitch of the image pickup plane 11 is 5.6 μm in the short-side direction (having parallax).

Such an arrangement may be further modified such that the reflection of light in the relay lens groups R1R and R1L takes place at an obtuse angle (of, e.g., 150°, and 360° in FIGS. 4–6), so that while ensuring an area capable of stereo-phototaking (wherein the range of overlap of the angles of view of both OSR and OSL is an angle of view of about 60°), the field of both in the horizontal direction can be made much wider (with the total angle of field is about 180° in the horizontal direction). For instance, such a modified arrangement provides an optical system better fit for surveillance cameras or onboard cameras (as described later), because parallactic information on the image plane obtained at the center of the optical system where both fields overlap each other can be used for range-finding or other purposes, and a much wider field can be watched at the periphery of the optical system.

Figure 7:
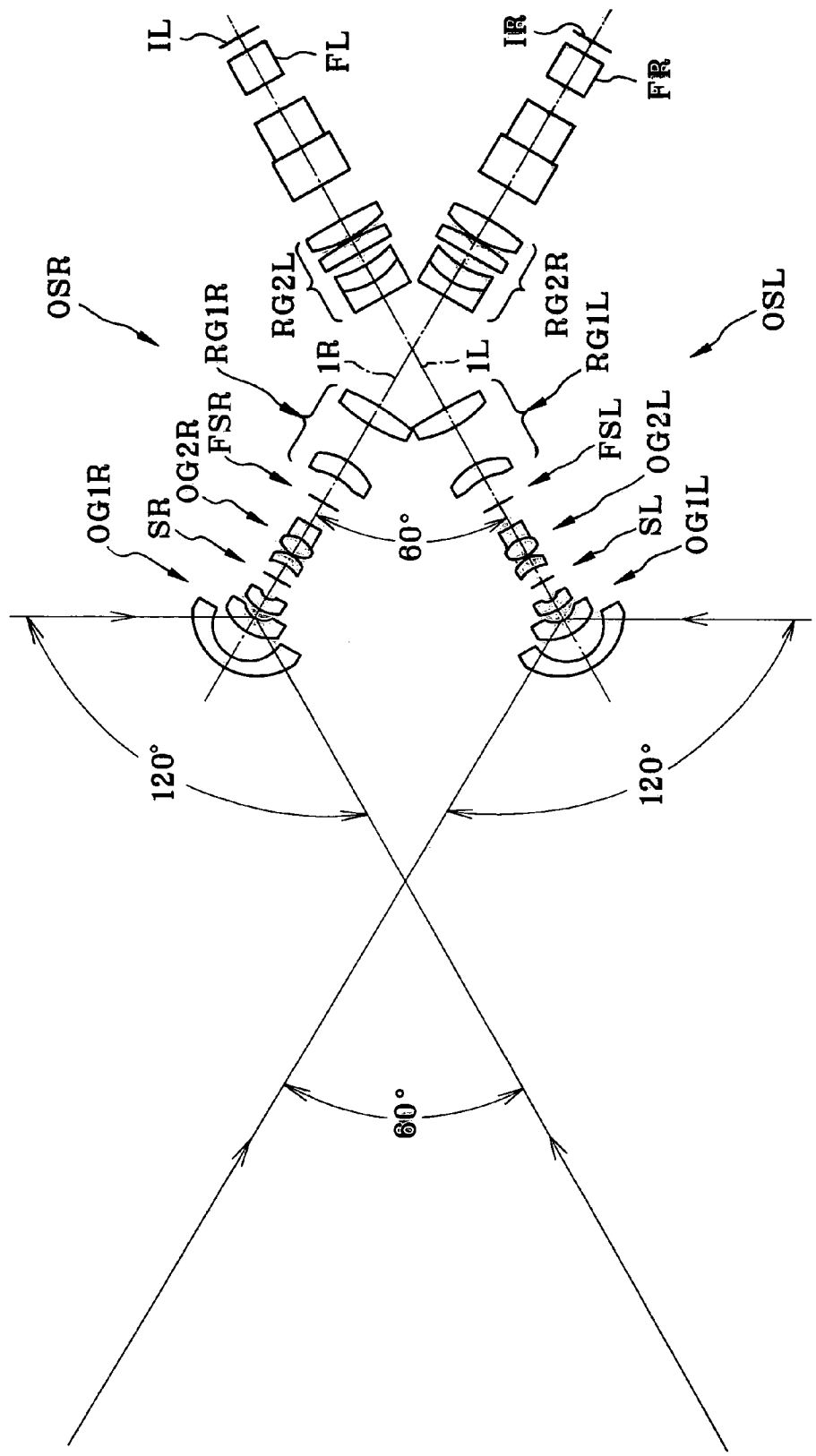
FIG. 7 is a plan view of one embodiment of a panoramic stereo camera that incorporates the superwide-angle lens optical system of the invention.

The superwide-angle lens optical systems OSR and OSL of the invention could also be set up in the form of a straightness system, wherein air spaces are provided between the front lens subgroups RG1R, RG1L and the rear lens subgroups RG2R, RG2L in the relay lens groups R1R, R1L and both optical systems OSR and OSL cross in those spaces (e.g., at an angle of 60°), as shown in the plan view of FIG. 7. Such an optical system is favorable for thickness reductions, and could be used as the aforesaid panoramic stereo camera as well.

The number of bending light rays through the superwide-angle lens optical system of the invention is not limited to 2 as in Example 1, and the bending direction is not limited to bending within the same plane as in Example 1, either. For instance, each optical path could be bent through three reflections for thickness reduction purposes.

For instance, when three or more such superwide-angle lens optical systems of the invention are used for stereo-phototaking, two of the optical systems could be located such that the objective lens groups are opposed to a subject in a parallactic direction (now assumed to be a left-and-right direction), and a reflecting member such as a reflecting mirror could be located in the objective lens group (for instance, the position of the stop between the negative front lens subgroup and the positive rear lens subgroup) or just after the objective lens group, so that the optical path is bent in the same direction substantially vertical to a plane including the optical axis (for instance, downward). In this arrangement, light is reflected at the reflecting member located in a space in the relay lens group in such a direction that both optical axes come close to each other, and the optical axes are bent by another reflecting surface located adjacent to the image pickup device toward the subject side or its opposite side to guide the optical axes different positions on the image pickup plane of the common image pickup device.

Figure 8:
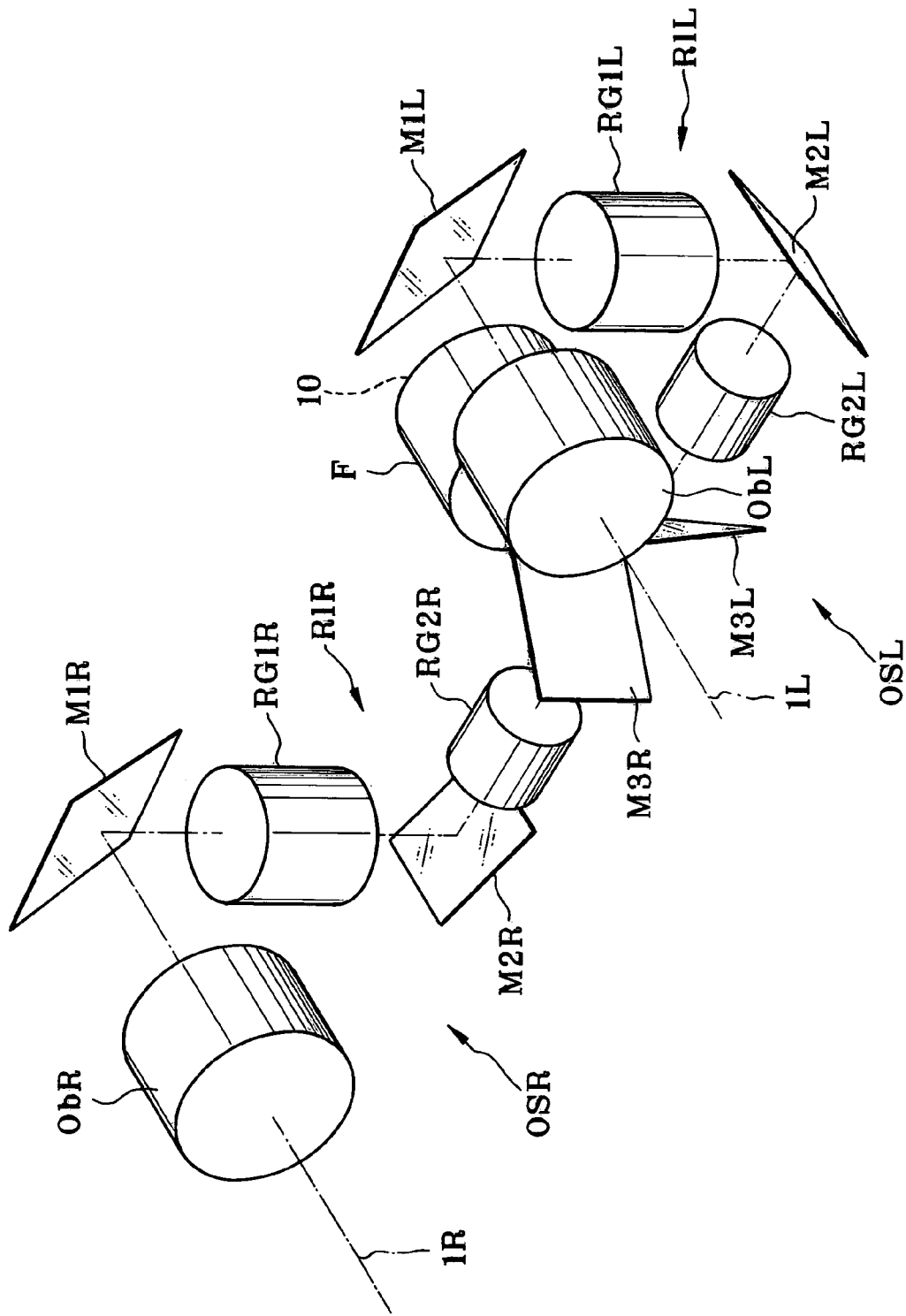
FIG. 8 is a perspective view of another embodiment of the panoramic stereo camera that incorporates the superwide-angle lens optical system of the invention.
Figure 9:
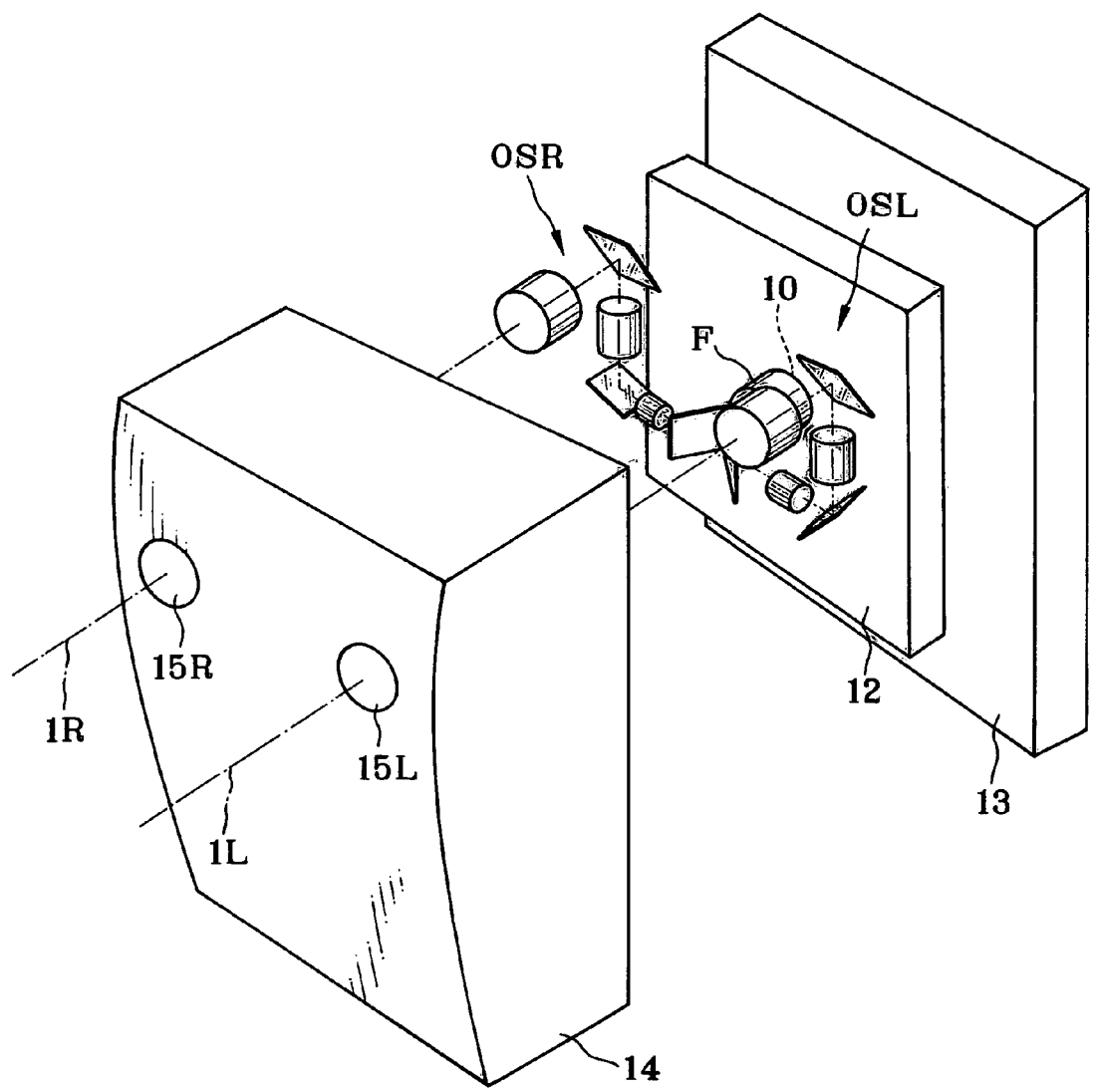
FIG. 9 is an exploded perspective view of the stereo-imaging unit of FIG. 8.

Such an arrangement is shown in the perspective view of FIG. 8. In this embodiment, the first reflecting members M1R and M1L are located just after the objective lens groups ObR and ObL in the right and left superwide-angle lens optical systems OSR and OSL, respectively, to bend optical paths downwardly, the second reflecting members M2R and M2L are interposed between the front lens subgroups RG1R, RG1L and the rear lens subgroups RG2R and RG2L in the relay lens groups R1R and R1L to reflect light in such a direction that both optical axes come close to each other, and the third reflecting members M3R and M3L are located just after the relay lens groups R1R and R1L to bend the optical axes in such a way as to face away from a subject, so that the respective optical axes 1R and 1L can be guided to different positions on the image pickup plane of the image pickup device 10 via a filter F common to the optical paths for both optical systems OSR and OSL. By bending the optical paths, it is thus possible to achieve a more slimmed down stereo-imaging unit. In this connection, FIG. 9 is an exploded perspective view of a stereo-imaging unit wherein such optical systems as shown in FIG. 8 are encased in a cover 14. The optical systems of FIG. 8 are attached to a base substrate 12 that is mounted on a back framework 13. The cover 14 provided with windows 15R and 15L through which light enters the right and left optical systems OSR and OSL is attached to the back framework 13 to complete a stereo-imaging unit.

It is noted that such a stereo-imaging unit could be configured into a monocular slim imaging unit by detachment of one imaging optical system therefrom, and that a plurality of image pickup elements juxtaposed on the same substrate could be used for the image pickup device.

Another embodiment of the invention is now explained. A reflecting surface capable of both transmission and reflection (a mirror, a reflecting prism or the like) is interposed between the front and rear lens subgroups in the relay lens group in the superwide-angle lens optical system of the invention, and the rear lens subgroup in the relay lens group is located on the transmission side of that reflecting surface while the image pickup device is located on the reflection side thereof, thereby providing a multi-functional optical system. For instance, image pickup devices could be positioned after the rear lens subgroups in the relay lens groups such that one optical system is operable in association with a bright subject and another in association with a dark subject. It is thus possible to achieve an optical system having a wide dynamic range. Specifically, a member for decreasing the quantity of light (e.g., an ND filter) could be located in one optical path for the purpose of addressing a bright subject. Alternatively, reflecting surfaces having varying transmittance/reflectance ratios could be interposed between the front and rear lens subgroups in the relay lens groups to ensure a much wider dynamic range.

Figure 10:
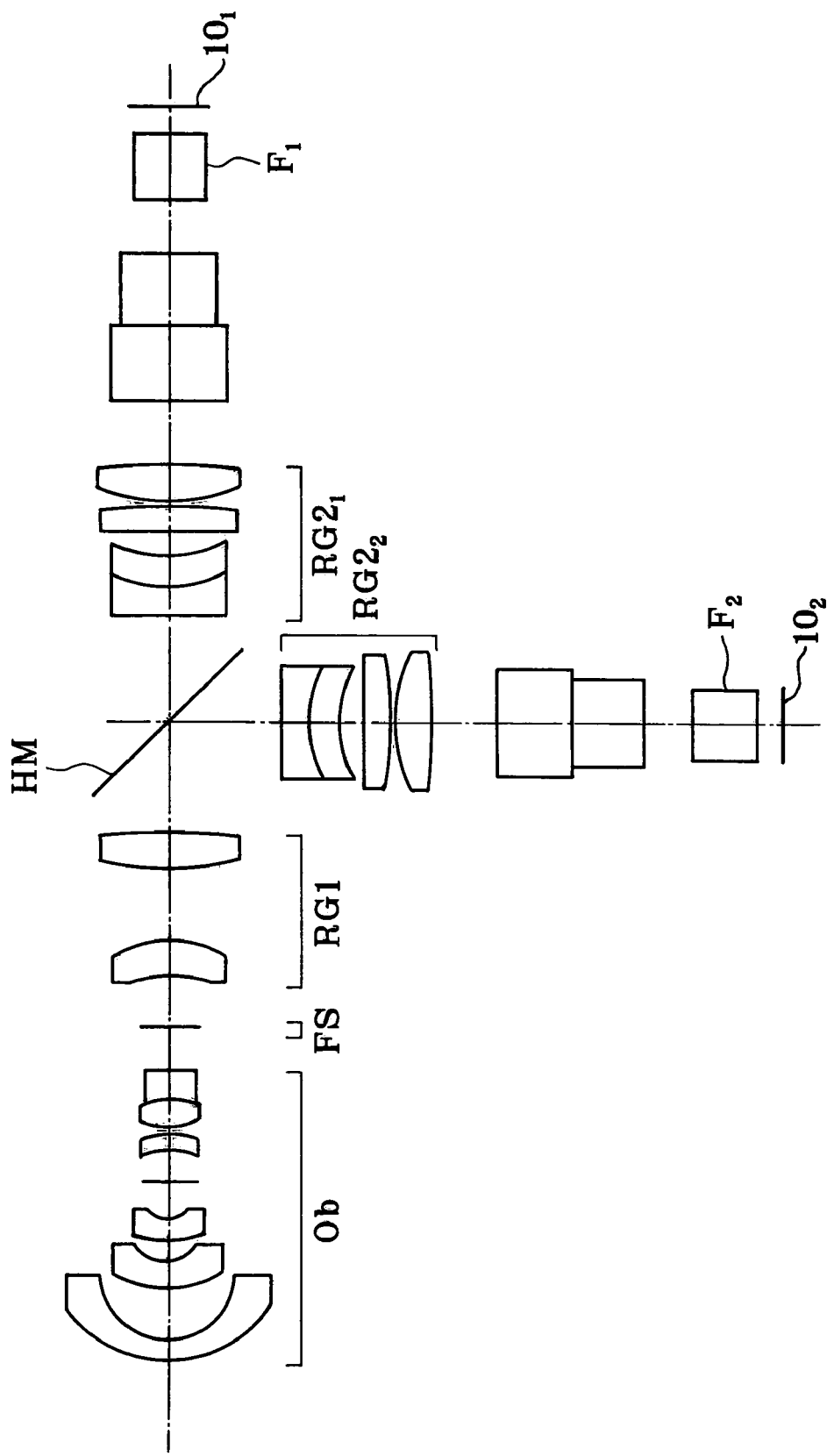
FIG. 10 is an optical path diagram for one embodiment of a super-latitude camera that incorporates the superwide-angle lens optical system of the invention.

FIG. 10 is an optical path diagram for a super-latitude camera as such an example. In this example, a half-silvered mirror HM is positioned just after a front lens subgroup RG1 in a relay lens group. On the transmission side of that mirror there are positioned a rear lens subgroup $RG2_1$ in a relay lens group of the same construction, a filter $F_1$ and an image pickup device 101, and on the reflection side of that mirror there are positioned a rear lens subgroup $RG2_2$ in a relay lens group of the same construction, a filter $F_2$ and an image pickup device $10_2$, so that the same subject can be phototaken at a superwide-angle through the respective optical paths. The half-silvered mirror HM used herein, for instance, has a transmittance of 70% and a reflectance of 30%. In this arrangement, an image of a relatively dark subject is picked up through an optical path running to the image pickup device $10_1$ by way of a common objective lens group Ob, a field stop FS, the front lens subgroup $RG_1$ in the relay lens group, the half-silvered mirror HM, the front lens subgroup $RG2_1$ in the relay lens group and the filter $F_1$, and an image of a relatively bright subject is picked up through an optical path running to the image pickup device $10_2$ by way of the common objective lens group Ob, the field stop FS, the front lens subgroup $RG_1$ in the relay lens group, the half-silvered mirror HM, a rear lens subgroup $RG2_2$ in the relay lens group and a filter $F_2$; the transmission-side optical path is for dark subject vision and the reflection-side optical path is for bright subject vision. It is thus possible to obtain a super-latitude camera having an enlarged dynamic range.

In this regard, it is to be understood that such a binocular mode as shown in FIGS. 4–6, not the monocular mode as shown in FIG. 10, could be applied to obtain stereo images or, alternatively, the binocular mode could be used to pick up images over a wider field.

Alternatively, in an arrangement wherein the common objective lens group is located as in FIG. 10, two rear lens subgroups in the relay lens groups could have different focal lengths to make the magnifications of the relay lens groups mutually different at both optical paths. In this case, images are picked up over a wide field with one image pickup device, and the central areas of images are picked up on an enlarged scale with another image pickup device.

Therefore, if the imaging unit of such construction, for instance, is designed for use as an onboard stereo camera, it is then possible to obtain a stereo image comprising a wide-angle field image through one optical path and a telephoto image through another optical system. For instance, when this arrangement is operated in the binocular mode to use a parallactic image for range-finding, range-finding capability can be improved.

In the binocular mode shown as in FIGS. 4–6, the optical paths could be bent in such a layout as to guide a wide-angle parallactic image onto one single image pickup device and a telephoto parallactic image onto another single image pickup device.

In the arrangement of FIG. 10, an image pickup device could be located in one of the reflection- or transmission-side optical path to make up an imaging system while a display device rather than an image pickup device could be located in another optical path. In this arrangement, the superwide-angle lens optical system of the invention can have both a phototaking lens function and a projection lens function.

In that case, image signals of an image picked up with the image pickup device, for instance, could be stored in memory means via processing means. The image information is read out of that memory means via the processing means to display an image on the display device, and the image displayed on the display device is then illuminated with illumination means for projection onto a screen, a wall, a front glass or the like by way of the relay lens groups and objective lens group.

This arrangement ensures that the phototaken image can be projected and observed in situ as a more realistic image.

Here it is easy to obtain a more realistic projected image because distortions of the phototaken image due to the objective lens group are well corrected by the displayed image traveling on the optical paths in an opposite direction to that for phototaking.

Here it is more preferable to use a switchover mirror as the transmitting/reflecting optical element interposed between the front and rear lens subgroups in the relay lens group, because losses of light quantity on the phototaking and projection sides are much more reduced.

Further, the phototaken image as well as image processing data, computer graphics or the like based thereon could be superposed on the displayed image; such a synthesized image could be displayed on the display device for projection purposes.

If a pattern is displayed on a display device and projected from it for reception at the image pickup device, that could then be used to sense distortions of images formed by an optical system after the transmitting/reflecting optical element.

Figure 11:
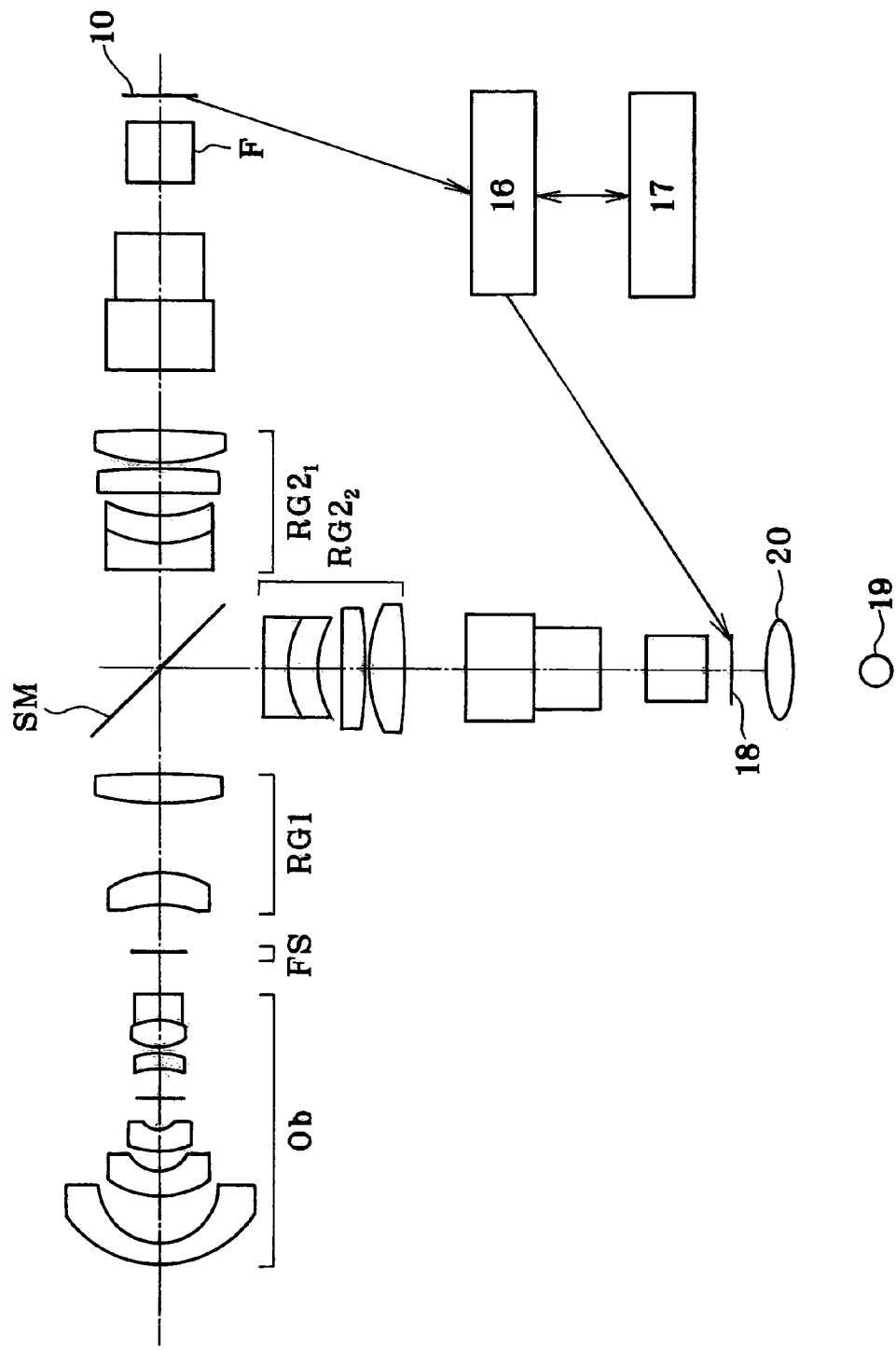
FIG. 11 is illustrative of one exemplary construction of a system that uses the superwide-angle lens optical system of the invention for phototaking and projection purposes.

FIG. 11 is illustrative of the construction of a phototaking/projection unit wherein an image pickup device is located in one of the aforesaid reflection- or transmission-side optical patha and a display device is located in another optical path. Specifically, a switchover mirror SM is located just after a front lens subgroup RG1 in a relay lens group. On the transmission side of the switchover mirror SM there are positioned a rear lens subgroup $RG2_1$ in a relay lens group, a filter F and an image pickup device 10, and on the reflection side thereof there are disposed a rear lens subgroup $RG2_2$ in a relay lens group, a display device LCD (liquid crystal display device) 18, a light source 19 for illuminating that LCD 18 and an illumination lens 20 for directing illumination light to LCD 18; an optical path on the side of the image pickup device 10 is used for an image pickup system and an optical path on the side of LCD 18 for a projection system. The image pickup device 10 is connected with processing means 16 for processing image signals of an image picked up at the image pickup device 10 via the image pickup system, while the processing means 16 is connected with memory means 17 and LCD 18.

While the switchover mirror SM is detached from such an arrangement, an image phototaken by the image pickup device 10 via an objective lens group Ob, a field stop FS, the front lens subgroup RG1 in the relay lens group, the rear lens subgroup $RG2_1$ in the relay lens group and the filter F is stored in the memory means 17 via the processing means 16. Then, the switchover mirror SM is inserted in the optical path, whereby the image information stored in the memory means 17, for instance, is read out in situ via the processing means 16 and displayed on LCD 18. With backlight from the light source 19 directed to the back surface of LCD 18 through the illumination lens 20, an image displayed on LCD 18 is projected onto the in situ screen, wall, front glass or the like via the rear lens subgroup $RG2_2$ in the relay lens group, the switchover mirror SM, the front lens subgroup RG1 in the relay lens group, the field stop FS and the objective lens group Ob, so that the phototaken image can be projected and observed in situ as a more realistic image. Further, the phototaken image as well as image processing data, computer graphics or the like based thereon could be superposed on the displayed image; such a synthesized image could be displayed on the display device for projection purposes.

In this regard, it is noted that the superwide-angle lens optical system could be designed such that even with an increased space between the front and rear lens subgroups in the relay lens group, its optical performance is less affected. To this end, it preferable that the length between the front and rear lens subgroups in the relay lens group is adjustable, so that optical members such as an ND or polarizing filter, a wavelength filter for limiting transmitted wavelengths and a mirror for guiding the optical path to an image-observation eyepiece optical system can be inserted between the front and rear lens subgroups. Preferably in this case, the length between the front and rear lens subgroups in the relay lens group should be adjusted depending on the optical member to be inserted.

In the case where a pair of the superwide-angle lens optical systems of the invention are used such that a reflecting surface is interposed between the front and rear lens subgroups in each relay lens group to bent an optical path for stereo-phototaking, the space between the front and rear lens subgroups in the relay lens group could be adjusted to a desired base-line length to obtain parallactic images. This arrangement is suitable for a stereo-imaging unit with a fixed image pickup plane.

In specific numerical Example 1 relying upon that arrangement, the spaces between the front and rear lens subgroups in the relay lens groups of both the optical systems could be variable. Alternatively, the space between the front and rear lens subgroups in the relay lens group of only one optical system could be variable to vary a space between entrance optical axes.

In such a stereo-imaging unit as shown in FIGS. 4–6, a transmitting/reflecting surface could be located at any one of a position for receiving the aperture stop S between the front and rear lens subgroups OG1 and OG2 in the objective lens group Ob (FIG. 2), a position at or near the image pickup plane, and a position between the front and rear lens subgroups RG1 and RG2 in the relay lens group R1 to locate a photometric optical system and a photometric receptor on the reflection or transmission side thereof. In that case, a photometric mode of making photometric measurements at a plurality of areas with a plurality of photometric devices could be used.

In the invention, three or more superwide-angle lens optical systems of the invention could be assembled into a wide-field-angle imaging unit wherein the entrance optical axes of three such optical systems are set in mutually different directions. For instance, a plurality of superwide-angle lens optical systems of the invention wherein each optical axis is bent at the relay lens group could be located in front of an image pickup area or areas of a common image pickup device or juxtaposed image pickup devices with the optical axes of the individual objective lens groups set in mutually different directions. Referring specifically to an arrangement comprising three inventive superwide-angle lens optical systems of Example 1 having a horizontal angle of view of about 120°, if the entrance optical axes of the superwide-angle lens optical systems designed to bend the optical axes 90° only once in the vertical direction are arranged at such angles as to be mutually 120° on the same plane (horizontal plane), it is possible to pick up images all over the circumference of 360°; in other words, that arrangement is well fit for surveillance cameras, onboard cameras or the like. It is also possible to subject picked up images to signal processing thereby obtaining 360° panoramic photographs or images.

It is to be understood that the number of the inventive superwide-angle lens optical systems used is not limited to three; four optical systems could be arranged every 90° in the horizontal direction and their optical axes could be bent optionally with mirrors to form four images on one single CCD. In this case, four such optical systems could be assembled into an optical unit with overlaps (due to a superwide-angle arrangement having an angle of view of 90° or greater), which enables images to be picked up over 360° by electrical image synthesis.

According to the superwide-angle lens optical system of the invention, it is easy to provide a space between the front and rear lens subgroups in the relay lens group. A prism that splits light into three parts could be positioned in that space. Specifically, after the prism that splits the optical path into three parts at a position where it is located, there are provided the rear lens subgroup in the relay lens group and a color filter of each of the three primary colors corresponding to each optical path, with an image pickup device located on each image plane. In this way, it is possible to provide a so-called triple imaging optical system having satisfactory color reproducibility.

If display devices are located in place of three such image pickup devices, it is then possible to achieve a so-called triple projection optical system.

Further, two dichroic mirrors could be interposed between different lens groups in the optical path (for instance, between the front and rear lens subgroups in the relay lens group, and after that rear lens subgroup) to form separate optical systems with individual optical paths for triple phototaking, and triple projection. In specific numerical Example 1, individual reflecting surfaces are each composed of a dichroic mirror, and on the transmission side of the first reflecting mirror M1 of each optical system there are provided the rear lens subgroup in the relay lens group and an image pickup device while there is provided an image pickup device on the transmission side of the second reflecting mirror (reflecting prism M2) composed of a dichroic mirror for the purpose of triple phototaking with each optical system. It is thus possible to achieve more accurate stereophototaking optical systems, range-finder units, onboard cameras, surveillance cameras, etc.

Figure 12:
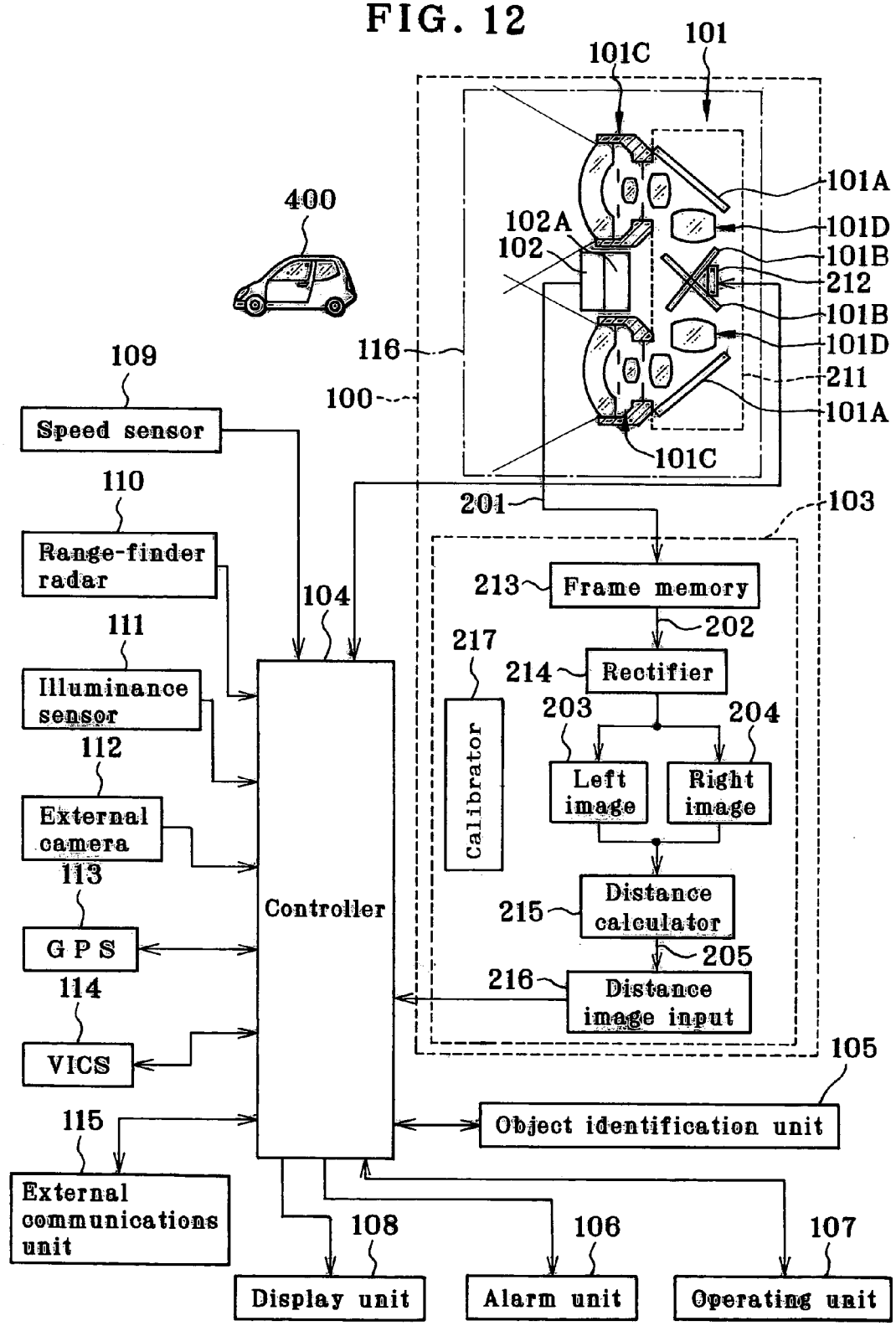
FIG. 12 is illustrative of one exemplary construction of a stereo-imaging system to which the stereo-imaging unit of the invention is applied.

FIG. 12 is typically illustrative of the construction of a stereo-imaging system to which the stereo-imaging unit as embodied in FIGS. 4–6 is applied. The stereo-imaging system is now explained as an onboard system.

That is, this stereo-imaging system is composed of a distance image input unit 100, a control unit 104, an object identification unit 105, an alarm unit 106, a operating unit 107, a display unit 108, a speed sensor 109, a range-finder radar 110, an illuminance sensor 111, an external camera 112, a GPS (global poisoning system) 113, a VICS (vehicle information and communications system) 114 and an external communications unit 115.

Here the aforesaid distance image input unit 100 is comprised of a stereo-imaging unit 116 having an image pickup device 102 for phototaking a subject 400 and a stereo-imaging optical system 101 mounted in front of that image pickup device 102, and a distance image processor 103 for measuring a distance image 205 of the subject 400.

As is the case with generally available video cameras, digital still cameras or the like, the stereo-imaging unit 116 is optionally provided with a phototaking stop controller (not shown), a phototaking focus controller (not shown), a phototaking shutter speed controller (not shown) and a sensitivity controller (not shown).

The stereo-imaging optical system 101 includes a reflecting optical system 211 comprising a plurality of mirror (a pair of mirrors 101A and 101B). This reflecting optical system 211 is mounted in front of a forward filter group 102A in such a way that images of the subject 400 incident from an objective lens group 101C and coming from different points of view are once formed into an intermediate image and that intermediate image is then formed on the image pickup device 102 through a relay lens group 101D via the filter group 102A.

A stereo-image 201 phototaken at the stereo-imaging unit 116, i.e., one captured at the image pickup device 102 is fed to the distance image processor 103 as shown in FIG. 12, where it is processed into a three-dimensional distance image 205 that is in turn sent to the controller 104 and object identification unit 105.

It is noted that the term "distance image" used herein stands for an image having distance information in a subject's image pixel.

It is noted that reference numeral 212 in FIG. 12 is indicative of an exposure controller that is connected to the aforesaid phototaking stop controller, phototaking focus controller, phototaking shutter speed controller and sensitivity controller that the stereo-imaging unit 116 has, all not shown. The exposure controller 212 is also connected to the controller 104 for controlling the imaging unit 116 in dependence on an exposure value calculated on the basis of brightness information from the image pickup device 102.

As described above, the stereo-image 201 picked up at the image pickup device 102 is entered in the distance image processor 103. The stereo-image 201 is further entered in a frame memory 213, presenting a digital image 202.

The output of the frame memory 213 is entered in a rectifier 214, from which a left image 203 and a right image 204 are sent out to a distance calculator 215. The distance calculator 215 delivers a three-dimensional image 205 to the object identification unit 105 by way of a distance image output 216. The distance calculator 215 also delivers a two-dimensional image (stereo-image 201), distance image 205, etc. to the controller 104.

It is noted that the distance image processor 103 also includes a separate calibrator 217 that delivers a rectification parameter to the rectifier 214, a distance-calculation parameter to the distance calculator 215 and an object-identification parameter to the object identification unit 105.

The object identification unit 105 makes use of the entered three-dimensional distance image 205 to identify an object or an object area present therein and, delivers out the resulting object data (not shown).

Each of the components in the distance image processor 103 could be implemented on computer software.

The controller 104 has a role in integration of image information and vehicle information. For instance, it is operable to display the results of processing at the distance image processor 103 on the display unit 108, make an analysis of distance information obtained at the distance image processor 103, information from the speed sensor 103, etc. to actuate the alarm unit 106 to give an alarm, and control the operating unit 107 to urge a driver to drive carefully. The alarm unit 106 comprises a voice-warning device, a vibrator and so on. For instance, the voice-warning device produces voices from a speaker or the like, and the vibrator forces a driver's seat to vibrate to give an alarm to the driver.

Although how to operate the system incorporating the stereo-imaging unit is not explained at great length because of having no direct relation to the invention, it is noted that image information obtained from the stereo-imaging unit 116 of the invention and the distance image input unit 100 and vehicle information garnered from various sensors can be integrated to display the image information on the display unit 108, actuate the alarm unit 106 to issue an alarm, and control or otherwise operate the operating unit 107, thereby urging the driver to drive carefully.

For instance, as the vehicle comes too close to a subject in front, just only a cautionary display or alarm can be shown or issued but also the operating unit 107 (e.g., a brake) can be controlled.

Alternatively, that system can be used to read a highway central division for automatic control of operation, etc.

Besides, the system of this embodiment may be used as sensors to sense other vehicles in front and in the rear, obstacles, white lines, etc.; to detect the positions and directions of the driver and a passenger(s) for prevention of dozing and looking aside while driving; and to actuate an airbag safely while judging whether those on board are children or adults and the positions and directions of their faces.

The stereo-imaging unit of the invention could be applied just only to an onboard stereo-imaging system but also to robots, railways, airplanes, ships, surveillance cameras, cameras for teleconferencing systems, etc.

In FIG. 12, it is noted that the mirrors 101A and 101B correspond to the reflecting mirrors M1R and M1L and the reflecting prisms M2R and M2L in FIGS. 4–6, respectively, the objective lens group 101C to the objective lens groups ObR and ObL, the relay lens group 101D to the relay lens groups R1R and R1L, the filter group 102A to the filter F, and the image pickup device 102 to the image pickup device 10.

I claim:

1. A superwide-angle lens optical system, which comprises, in order from an object side thereof, an objective lens group having positive refracting power, a primary image-formation plane formed by said objective lens group, and a relay lens group having positive refracting power, wherein a field stop is located at or near a position of said primary image-formation plane, and condition (1-1) is satisfied:

$$h/f_o > 1.8 \tag{1-1}$$

where $f_o$ is a focal length of said objective lens group, and h is a diameter of an image circle on said primary image-formation plane.

2. A superwide-angle lens optical system, which comprises, in order from an object side thereof, an objective lens group having positive refractive power, a primary image-formation plane formed by said objective lens group, a relay lens group having positive refracting power, and an image-reformation plane formed by said relay lens group, wherein condition (1-2) is satisfied:

$$h_r/f_a > 1.8 \tag{1-2}$$

where $f_a$ is a focal length of a combined system of said objective lens group and said relay lens group, and $h_r$ is a diameter of an image circle on said image-reformation plane.

3. A superwide-angle lens optical system, which comprises, in order from an object side thereof, an objective lens group having positive refracting power, a primary image-formation plane formed by said objective lens group, and a relay lens group having positive refracting power, wherein said relay lens group comprises a front lens subgroup having positive refracting power and a rear lens subgroup having positive refracting power, and satisfies condition (3):

$$0.05 < f_o/f_{r1} < 1.2 \tag{3}$$

where $f_{r1}$ is a focal length of the front lens subgroup in said relay lens group, and $f_o$ is a focal length of said objective lens group.

4. The superwide-angle lens optical system according to any one of claims 1 to 3, wherein said objective lens group comprises, in order from an object side thereof, a front lens subgroup having negative refracting power and a rear lens subgroup having positive refracting power, and an aperture stop is interposed between said front lens subgroup and said rear lens subgroup.

5. The superwide-angle lens optical system according to claim 4, wherein a conjugate image of said aperture stop is positioned between the front and rear lens subgroups in said relay lens group.

6. The superwide-angle lens optical system according to claim 4, wherein the front lens subgroup in said objective lens group comprises, in order from an object side thereof, a first meniscus lens having negative refracting power, a second meniscus lens having negative refracting power and a third meniscus lens having positive refracting power, and the rear lens subgroup in said objective lens group comprises a lens having positive refracting power and a cemented lens component having positive refracting power.

7. A superwide-angle lens optical system, which comprises, in order from an object side thereof, an objective lens group having positive refracting power, a primary image-formation plane formed by said objective lens group, and a relay lens group having positive refracting power, wherein a field stop is positioned at or near said primary image-formation plane, said relay lens group comprises a front lens subgroup having positive refracting power and a rear lens subgroup having positive refracting power, and condition (4) is satisfied:

$$4 < t_3/|f_a| \tag{4}$$

where $t_3$ is an air space between the front and rear lens subgroups in said relay lens group, and $f_a$ is a focal length of a combined system of said objective lens group and said relay lens group.

8. A superwide-angle lens optical system, which comprises, in order from an object side thereof, an objective lens group having positive refracting power, a primary image-formation plane formed by said objective lens group, and a relay lens group having positive refracting power, wherein a field stop is positioned at or near said primary image-formation plane, said relay lens group comprises a front lens subgroup having positive refracting power and a rear lens subgroup having positive refracting power, and conditions (3) and (4) are satisfied:

$$0.05 < f_o/f_{r1} < 1.2 \tag{3}$$

$$4 < t_3/|f_a| \tag{4}$$

where $f_{r1}$ is a focal length of the front lens subgroup in said relay lens group, $f_o$ is a focal length of said objective lens group, $t_3$ is an air space between the front and rear lens subgroups in said relay lens group, and $f_a$ is a focal length of a combined system of said objective lens group and said relay lens group.

9. The superwide-angle lens optical system according to any one of claims 3, 7 and 8, which satisfies condition (5):

$$1 < f_{r2}/f_{r1} < 2 \tag{5}$$

where $f_{r1}$ is a focal length of the front lens subgroup in said relay lens group, and $f_{r2}$ is a focal length of the rear lens subgroup in said relay lens group.

10. The superwide-angle lens optical system according to any one of claims 1, 2, 3, 7 and 8, which satisfies condition (6):

$$1 < \alpha < 2 \tag{6}$$

where $\alpha$ is a relay magnification of said relay lens group.

11. The superwide-angle lens optical system according to any one of claims 3, 7 and 8, which satisfies condition (7):

$$4 < f_{r2}/f_o < 15 \tag{7}$$

where $f_o$ is a focal length of said objective lens group, and $f_{r2}$ is a focal length of the rear lens subgroup in said relay lens group.

12. An imaging unit, which comprises the superwide-angle lens optical system according to any one of claims 1, 2, 3, 7 and 8 and an electronic image pickup device located on an image side thereof.

13. A display unit, which comprises the superwide-angle lens optical system according to any one of claims 1, 2, 3, 7 and 8 and a display device located on an image side thereof.

14. The superwide-angle lens optical system according to any one of claims 1, 2, 3, 7 and 8, wherein at least one reflecting member for bending an optical path is located.

15. The superwide-angle lens optical system according to claim 14, which includes a plurality of reflecting members, wherein the optical path is bent plural times by said plurality of reflecting members.

16. The superwide-angle lens optical system according to claim 15, wherein said plurality of reflecting members include a first reflecting member and a second reflecting member, and said relay lens group comprises a front lens subgroup having positive refracting power and a rear lens subgroup having positive refracting power, wherein said first reflecting member is interposed between said front lens subgroup and said rear lens subgroup and said second reflecting member is interposed between said rear lens subgroup and an image-reformation plane formed by said relay lens group.

17. The superwide-angle lens optical system according to claim 16, wherein said plurality of reflecting members further include a third reflecting member that is located within said objective lens group or on an image side of said objective lens group.

18. A stereo-imaging unit, which includes a plurality of superwide-angle zoom optical systems according to claim 16, and an electronic image pickup device located on an image side of the second reflecting member in each superwide-angle zoom optical system.

19. The stereo-imaging unit according to claim 18, wherein said electronic image pickup device is an electronic image pickup device common to said plurality of superwide-angle zoom optical systems, and said second reflecting member is located in such a way as to guide each optical axis onto different image pickup plane positions of said electronic image pickup device.

20. A stereo-imaging unit, which includes a plurality of imaging units according to claim 12.

21. The superwide-angle lens optical system according to any one of claims 1, 2, 3, 7 and 8, wherein said relay lens group includes a front lens subgroup having positive refracting power, a first rear lens subgroup having positive refracting power and a second rear lens subgroup having positive refracting power, wherein a reflecting member capable of transmission and reflection is located on an image side of said front lens subgroup, the first rear lens subgroup is located on a transmission side of said reflecting member, and the second rear lens subgroup is located on a reflection side thereof.

22. An imaging unit, which comprises the superwide-angle lens optical system according to claim 21, and an electronic image pickup device located on an image side of each of said first lens subgroup and said second lens subgroup in said superwide-angle lens optical system.

23. A stereo-imaging unit, which includes a plurality of the imaging units according to claim 22.

24. An imaging/display unit, which comprises the superwide-angle lens optical system according to claim 21, an electronic image pickup device located on an image side of either one of said first lens subgroup and said second lens subgroup in said superwide-angle lens optical system, and a display device located on another image side.

25. A range finder, which comprises the stereo-imaging unit according to claim 18, wherein distance information is obtained from parallactic information based on a plurality of superwide-angle lens optical systems in said stereo-imaging unit.

26. An onboard camera, which comprises the stereo-imaging unit according to claim 18.

27. A surveillance camera, which comprises the stereo-imaging unit according to claim 18.

28. A stereo-imaging system, which comprises the stereo-imaging unit according to claim 18.

29. The stereo-imaging system according to claim 28, which further comprises a controller for controlling said stereo-imaging unit based on image information from the electronic image pickup devices in said stereo-imaging unit.

30. The stereo-imaging system according to claim 28, which further comprises an image processor for processing two-dimensional images phototaken at the electronic image pickup devices in said stereo-imaging unit into a three-dimensional image.

31. The stereo-imaging system according to claim 30, which further comprises a display device for displaying thereon image information processed at said image processor.

32. The stereo-imaging system according to claim 29, which further comprises a sensor for sensing information on a subject and an alarm unit for giving an alarm based on results obtained by analysis at said controller of phototaking information from said stereo-imaging unit and subject information from said sensor.

33. An onboard stereo-imaging system mounted on a vehicle, which comprises:
   a controller for controlling said onboard stereo-imaging system,
   a sensor for sensing vehicle information,
   an operating unit for controlling the vehicle,
   the stereo-imaging unit according to claim 18,
   a distance image processor for processing two-dimensional images phototaken at the electronic image pickup devices in said stereo-imaging unit into a three-dimensional distance image including distance information,
   a display unit for displaying thereon the distance image processed at said distance image processor, and
   an alarm unit for giving an alarm based on the vehicle information from said sensor and results obtained by analysis of distance information obtained at said distance image processor, wherein:
   said controller controls said operating unit based on an alarm issued from said alarm unit.

34. The superwide-angle lens optical system according to claim 4, wherein each of the meniscus lenses in said front lens subgroup is a single lens.

35. A stereo-imaging unit, which includes a plurality of superwide-angle zoom optical systems according to claim 17, and an electronic image pickup device located on an image side of the second reflecting member in each superwide-angle zoom optical system.

36. The stereo-imaging unit according to claim 35, wherein said electronic image pickup device is an electronic image pickup device common to said plurality of superwide-angle zoom optical systems, and said second reflecting member is located in such a way as to guide each optical axis onto different image pickup plane positions of said electronic image pickup device.

37. A range finder, which comprises the stereo-imaging unit according to claim 35, wherein distance information is obtained from parallactic information based on a plurality of superwide-angle lens optical systems in said stereo-imaging unit.

38. An onboard camera, which comprises the stereo-imaging unit according to claim 35.

39. A surveillance camera, which comprises the stereo-imaging unit according to claim 35.

40. A stereo-imaging system, which comprises the stereo-imaging unit according to claim 35.

41. The stereo-imaging system according to claim 40, which further comprises a controller for controlling said stereo-imaging unit based on image information from the electronic image pickup devices in said stereo-imaging unit.

42. The stereo-imaging system according to claim 40, which further comprises an image processor for processing two-dimensional images phototaken at the electronic image pickup devices in said stereo-imaging unit into a three-dimensional image.

43. The stereo-imaging system according to claim 42, which further comprises a display device for displaying thereon image information processed at said image processor.

44. The stereo-imaging system according to claim 40, which further comprises a sensor for sensing information on a subject and an alarm unit for giving an alarm based on results obtained by analysis at said controller of phototaking information from said stereo-imaging unit and subject information from said sensor.

45. An onboard stereo-imaging system mounted on a vehicle, which comprises:
   a controller for controlling said onboard stereo-imaging system,
   a sensor for sensing vehicle information,
   an operating unit for controlling the vehicle,
   the stereo-imaging unit according to claim 35,
   a distance image processor for processing two-dimensional images phototaken at the electronic image pickup devices in said stereo-imaging unit into a three-dimensional distance image including distance information,
   a display unit for displaying thereon the distance image processed at said distance image processor, and
   an alarm unit for giving an alarm based on the vehicle information from said sensor and results obtained by analysis of distance information obtained at said distance image processor, wherein:
   said controller controls said operating unit based on an alarm issued from said alarm unit.

* * * * *